United States Patent
Akkarakaran et al.

(10) Patent No.: US 11,438,795 B2
(45) Date of Patent: Sep. 6, 2022

(54) HARQ PROCESS IDENTIFICATION

(71) Applicant: QUALCOMM Incorporated, San Diego, CA (US)

(72) Inventors: Sony Akkarakaran, Poway, CA (US); Tao Luo, San Diego, CA (US); Juan Montojo, San Diego, CA (US); Seyed Ali Akbar Fakoorian, San Diego, CA (US); Yan Zhou, San Diego, CA (US); Mostafa Khoshnevisan, San Diego, CA (US); Kazuki Takeda, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 16/908,264

(22) Filed: Jun. 22, 2020

(65) Prior Publication Data
US 2020/0413289 A1  Dec. 31, 2020

Related U.S. Application Data

(60) Provisional application No. 62/867,588, filed on Jun. 27, 2019.

(51) Int. Cl.
*H04W 28/04* (2009.01)
*H04L 1/18* (2006.01)

(52) U.S. Cl.
CPC .......... *H04W 28/04* (2013.01); *H04L 1/1812* (2013.01)

(58) Field of Classification Search
CPC .... H04W 28/04; H04L 1/1812; H04L 1/1896; H04L 1/1822
See application file for complete search history.

(56) References Cited

U.S. PATENT DOCUMENTS

2009/0103500 A1* 4/2009 Malkamaki ........... H04L 1/1854
370/336
2017/0048886 A1  2/2017 Sun et al.
(Continued)

FOREIGN PATENT DOCUMENTS

WO      2017123356 A1   7/2017
WO   WO-2017123356 A1 * 7/2017  ........... H04L 1/1614
(Continued)

OTHER PUBLICATIONS

International Search Report and Written Opinion—PCT/US2020/039082—ISA/EPO—dated Oct. 9, 2020.

*Primary Examiner* — Asghar H Bilgrami
(74) *Attorney, Agent, or Firm* — Harrity & Harrity, LLP; Kevin M. Donnelly

(57) ABSTRACT

Various aspects of the present disclosure generally relate to wireless communication. In some aspects, a receiver may identify a hybrid automatic repeat request (HARQ) process, from one or more HARQ processes configured for a delay-constrained time cycle, for a data communication received from a transmitter in the delay-constrained time cycle. A quantity of the one or more HARQ processes may be based at least in part on a quantity of data communications that the receiver is to receive from a transmitter during the delay-constrained time cycle. The receiver may transmit, to the transmitter and based at least in part on the data communication, HARQ feedback associated with the HARQ process. Numerous other aspects are provided.

30 Claims, 15 Drawing Sheets

(56) References Cited

U.S. PATENT DOCUMENTS

| | | |
|---|---|---|
| 2017/0346606 A1 | 11/2017 | Li et al. |
| 2018/0270807 A1* | 9/2018 | Salem et al. |
| 2019/0141727 A1* | 5/2019 | Si .................... H04W 72/1268 |
| 2019/0223042 A1* | 7/2019 | Su .................... H04W 72/1289 |
| 2019/0288804 A1* | 9/2019 | Jiang .................... H04L 1/0003 |
| 2020/0037314 A1 | 1/2020 | Xiong et al. |
| 2020/0177352 A1* | 6/2020 | Peng .................... H04L 1/18 |
| 2021/0176017 A1* | 6/2021 | Jia .................... H04L 1/1896 |

FOREIGN PATENT DOCUMENTS

| | | | |
|---|---|---|---|
| WO | 2018171242 A1 | 9/2018 | |
| WO | 2018211364 A1 | 11/2018 | |
| WO | WO-2018211364 A1 * | 11/2018 | ........... H04L 1/1819 |
| WO | 2019005920 A1 | 1/2019 | |
| WO | WO-2019005920 A1 * | 1/2019 | ............... H04L 1/08 |

* cited by examiner

HARQ PROCESS IDENTIFICATION

CROSS-REFERENCE TO RELATED APPLICATION

This Patent Application claims priority to U.S. Provisional Patent Application No. 62/867,588, filed on Jun. 27, 2019, entitled "HARQ PROCESS IDENTIFICATION FOR IIOT," and assigned to the assignee hereof. The disclosure of the prior Application is considered part of and is incorporated by reference into this Patent Application.

FIELD OF THE DISCLOSURE

Aspects of the present disclosure generally relate to wireless communication, and more particularly to techniques and apparatuses for hybrid automatic repeat request (HARQ) process identification.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, or the like, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipment (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

A UE and a base station (BS) may be included in various types of deployments. An example deployment may include an industrial internet of things (IIoT) deployment, in which the UE and the BS may be associated with a smart factory or industrial setting. In an IIoT deployment, the UE and the BS may communicate in one or more IIoT time cycles, each of which may include one or more self-contained 1 millisecond (ms) time durations. The information exchanged between the UE and the BS in an IIoT time cycle may be relatively small in size. However, a large amount of signaling overhead may be needed in order to schedule and track hybrid automatic repeat request (HARQ) feedback during the IIoT time cycle.

SUMMARY

In some aspects, a method of wireless communication, performed by a receiver, may include identifying a hybrid automatic repeat request (HARQ) process, from one or more HARQ processes configured for a delay-constrained time cycle, for a data communication received from a transmitter in the delay-constrained time cycle, a quantity of the one or more HARQ processes being based at least in part on a quantity of data communications that the receiver is to receive from a transmitter during the delay-constrained time cycle. The method may include transmitting, to the transmitter and based at least in part on the data communication, HARQ feedback associated with the HARQ process.

In some aspects, a method of wireless communication, performed by a transmitter, may include transmitting, to a receiver, a data communication in a delay-constrained time cycle. The method may include receiving, for the data communication, HARQ feedback associated with a HARQ process from one or more HARQ processes configured for the delay-constrained time cycle, a quantity of the one or more HARQ processes being based at least in part on a quantity of data communications that the transmitter is to transmit to the receiver during the delay-constrained time cycle.

In some aspects, a receiver for wireless communication may include memory and one or more processors operatively coupled to the memory. The memory and the one or more processors may be configured to identify a HARQ process, from one or more HARQ processes configured for a delay-constrained time cycle, for a data communication received from a transmitter in the delay-constrained time cycle, a quantity of the one or more HARQ processes being based at least in part on a quantity of data communications that the receiver is to receive from a transmitter during the delay-constrained time cycle. The memory and the one or more processors may be configured to transmit, to the transmitter and based at least in part on the data communication, HARQ feedback associated with the HARQ process.

In some aspects, a transmitter for wireless communication may include memory and one or more processors operatively coupled to the memory. The memory and the one or more processors may be configured to transmit, to a receiver, a data communication in a delay-constrained time cycle. The memory and the one or more processors may be configured to receive, for the data communication, HARQ feedback associated with a HARQ process from one or more HARQ processes configured for the delay-constrained time cycle, a quantity of the one or more HARQ processes being based at least in part on a quantity of data communications that the transmitter is to transmit to the receiver during the delay-constrained time cycle.

In some aspects, a non-transitory computer-readable medium may store one or more instructions for wireless communication. The one or more instructions, when executed by one or more processors of a receiver, may cause the one or more processors to identify a HARQ process, from one or more HARQ processes configured for a delay-constrained time cycle, for a data communication received from a transmitter in the delay-constrained time cycle, a quantity of the one or more HARQ processes being based at least in part on a quantity of data communications that the receiver is to receive from a transmitter during the delay-constrained time cycle. The one or more instructions, when executed by the one or more processors of the receiver, may cause the one or more processors to transmit, to the transmitter and based at least in part on the data communication, HARQ feedback associated with the HARQ process.

In some aspects, a non-transitory computer-readable medium may store one or more instructions for wireless communication. The one or more instructions, when executed by one or more processors of a transmitter, may cause the one or more processors to transmit, to a receiver, a data communication in a delay-constrained time cycle. The one or more instructions, when executed by the one or more processors of the transmitter, may cause the one or more processors to receive, for the data communication, HARQ feedback associated with a HARQ process from one or more HARQ processes configured for the delay-constrained time cycle, a quantity of the one or more HARQ processes being based at least in part on a quantity of data communications that the transmitter is to transmit to the receiver during the delay-constrained time cycle.

In some aspects, an apparatus for wireless communication may include means for identifying a HARQ process, from one or more HARQ processes configured for a delay-constrained time cycle, for a data communication received from a transmitter in the delay-constrained time cycle, a quantity of the one or more HARQ processes being based at least in part on a quantity of data communications that the apparatus is to receive from a transmitter during the delay-constrained time cycle. The apparatus may include means for transmitting, to the transmitter and based at least in part on the data communication, HARQ feedback associated with the HARQ process.

In some aspects, an apparatus for wireless communication may include means for transmitting, to a receiver, a data communication in a delay-constrained time cycle. The apparatus may include means for receiving, for the data communication, HARQ feedback associated with a HARQ process from one or more HARQ processes configured for the delay-constrained time cycle, a quantity of the one or more HARQ processes being based at least in part on a quantity of data communications that the apparatus is to transmit to the receiver during the delay-constrained time cycle.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
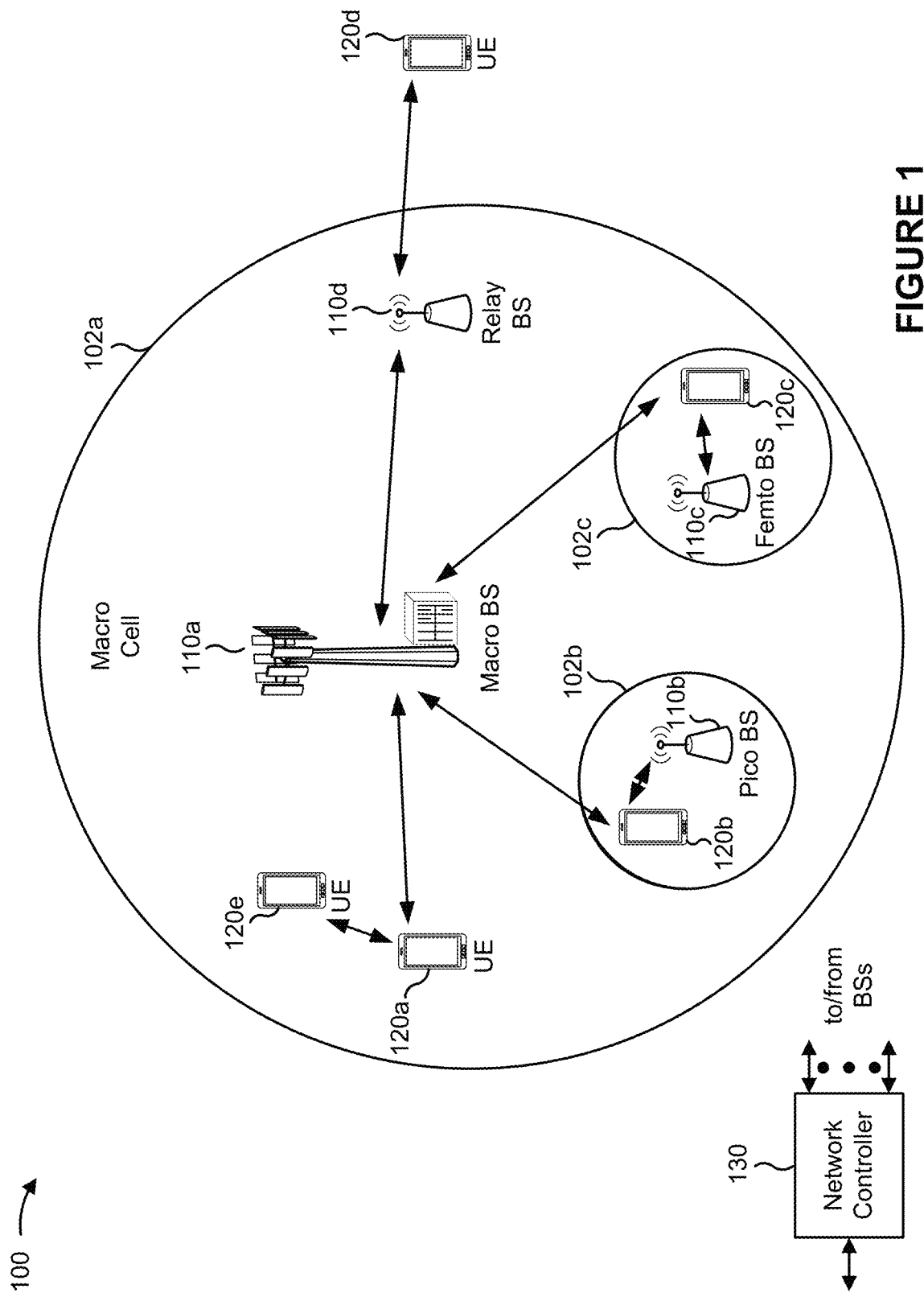
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like, or combinations thereof (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G or 4G wireless technologies, aspects of the present disclosure can be applied in other generation-based communication systems, such as 5G and later, including NR technologies.

Industrial IoT (IIoT) is a branch of cellular technology in which user equipment (UEs) and base stations (BSs) may be used to carry control data, measurement data, and/or the like between various industrial systems. For example, IIoT may be used to control sensors and/or actuators, to exchange measurement information between programmable logic controllers (PLCs) of a factory floor (for example, in a factory automation application), and/or the like. In many applications, this traffic is treated as ultra-reliable low-latency communication (URLLC) traffic, which imparts strict latency and reliability requirements. Thus, as the quantity of devices (such as sensors, actuators, PLCs, UEs, or the like) in a given IIoT deployment increases, the amount of overhead consumed by control signaling in the IIoT deployment may cause an increased latency in the IIoT deployment, may cause a decrease in an ability to meet reliability requirements of the IIoT deployment, or the like.

One type of signaling that may cause an inefficient consumption of overhead in an IIoT deployment may include signaling associated with configuring and tracking hybrid automatic repeat request (HARQ) feedback in an IIoT deployment. In some cases, a receiver may provide, to a transmitter, feedback associated with a data communication that was received from the transmitter. For example, a UE may provide feedback to a BS for a data communication that was received from the BS. As another example, a BS may provide feedback to a UE for a data communication that was received from the UE. The feedback may include, for example, HARQ feedback (such as an acknowledgment (ACK) or a negative acknowledgement (NACK) for the data communication). The BS may configure a plurality of HARQ processes that may be used by the UE and the BS for tracking HARQ feedback on a downlink and an uplink. The use of a plurality of HARQ processes may be used to reduce delays between the transmission of subsequent data communications in that, while a receiver is decoding a data communication and determining HARQ feedback for a HARQ process, the transmitter may concurrently transmit another data communication associated with another HARQ process. This permits back-to-back scheduling of data communication transmissions where a transmitter would typically have to wait to receive an ACK or NACK for a transmitted data communication before transmitting another data communication that may be a new packet or a retransmission of the packet transmitted in the previous data communication.

While the use of a plurality of HARQ processes may reduce the delay between transmissions of data packets, the quantity of bits needed to track HARQ process identifiers associated with each HARQ process consumes a large amount of signaling overhead, such as signaling overhead in downlink control information (DCI). As a result, the increased size of DCI may cause an increase in latency and a decrease in reliability in an IIoT deployment. For example, fewer DCI communications and corresponding data packets may be sent in an IIoT time cycle, the decoding time of decoding DCI communications may increase, the probability of missing or incorrectly decoding a DCI may increase, or the like. This can cause issues with the latency and reliability requirements of an IIoT deployment, which in turn may cause dropped data communications and/or other issues.

Some aspects described herein provide techniques and apparatuses for HARQ process identification. Some aspects described herein may be implemented in various in scenarios in which packets are transmitted and received with delay constrains, such as IIoT and other such scenarios. In some aspects, a delay-constrained time cycle may be self-contained in that the transmission (or retransmission) of a data communication, that is to be transmitted in the delay-constrained time cycle, is contained within the delay-constrained time cycle and does not span more than the delay-constrained time cycle. Accordingly, to reduce the signaling overhead of implementing HARQ in a delay-constrained deployment, a BS may determine a quantity of HARQ processes that is to be configured for a delay-constrained time cycle based at least in part on a quantity of data communications that a transmitter (such as the BS or the UE) is to transmit to a receiver (such as the BS or the UE) in the delay-constrained time cycle. This is possible because transmissions (or retransmissions) of data communications are to commence and complete in the same delay-constrained time cycle, which means that the receiver and transmitter do not have to track the same HARQ process for a data communication across a plurality of delay-constrained time cycles. Thus, the quantity of HARQ processes needed in the delay-constrained deployment for a receiver may be configured by the BS to be the same as the quantity of data transmissions that the transmitter is to transmit to the receiver in a single delay-constrained time cycle. Accordingly, because the quantity of data transmissions in a given delay-constrained time cycle may be small relative to the quantity of transmissions that the transmitter and receiver may track in non-delay-constrained deployment, configuring the quantity of HARQ processes based at least in part on the quantity of data communications to be transmitted by the transmitter to the receiver in a delay-constrained time cycle may reduce (or eliminate) the overhead of configuring and tracking HARQ in a delay-constrained deployment, which improves reliability in the delay-constrained deployment.

FIG. 1 is a block diagram illustrating an example wireless network 100 in accordance with various aspects of the present disclosure. The wireless network 100 may be a Long Term Evolution (LTE) network or some other wireless network, such as a 5G or NR network. The wireless network 100 may include a quantity of base stations (BSs) 110 (shown as BS 110a, BS 110b, BS 110c, and BS 110d) and other network entities. A BS is an entity that communicates with user equipment (UE(s)) and may also be referred to as a Node B, an eNodeB, an eNB, a gNB, a NR BS, a 5G node B (NB), an access point (AP), a transmit receive point (TRP), or the like, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

Wireless network 100 may be a heterogeneous network that includes BSs of different types, for example, macro BSs, pico BSs, femto BSs, relay BSs, or the like, or combinations thereof. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts). In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A network controller 130 may couple to the set of BSs 102*a*, 102*b*, 110*a* and 110*b*, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network 100 through various types of backhaul interfaces such as a direct physical connection, a virtual network, or the like, or combinations thereof using any suitable transport network.

Wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, or the like, or combinations thereof.

UEs 120 (for example, 120*a*, 120*b*, 120*c*) may be dispersed throughout wireless network 100, and each UE may be stationary or mobile. A UE may also be referred to as an access terminal, a terminal, a mobile station, a subscriber unit, a station, or the like, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, or the like, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or IIoT devices, or may be implemented as NB-IoT (narrowband internet of things) devices. Some UEs may be considered a Customer Premises Equipment (CPE). UE 120 may be included inside a housing that houses components of UE 120, such as processor components, memory components, or the like, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier or the like, or combinations thereof. Each frequency may support a single RAT in a given geographic area in order to avoid interference between wireless networks of different RATs. In some cases, NR or 5G RAT networks may be deployed.

In some aspects, two or more UEs 120 (for example, shown as UE 120*a* and UE 120*e*) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or the like, or combinations thereof), a mesh network, or the like, or combinations thereof. In this case, the UE 120 may perform scheduling operations, resource selection operations, or other operations described elsewhere herein as being performed by the base station 110.

Figure 2:
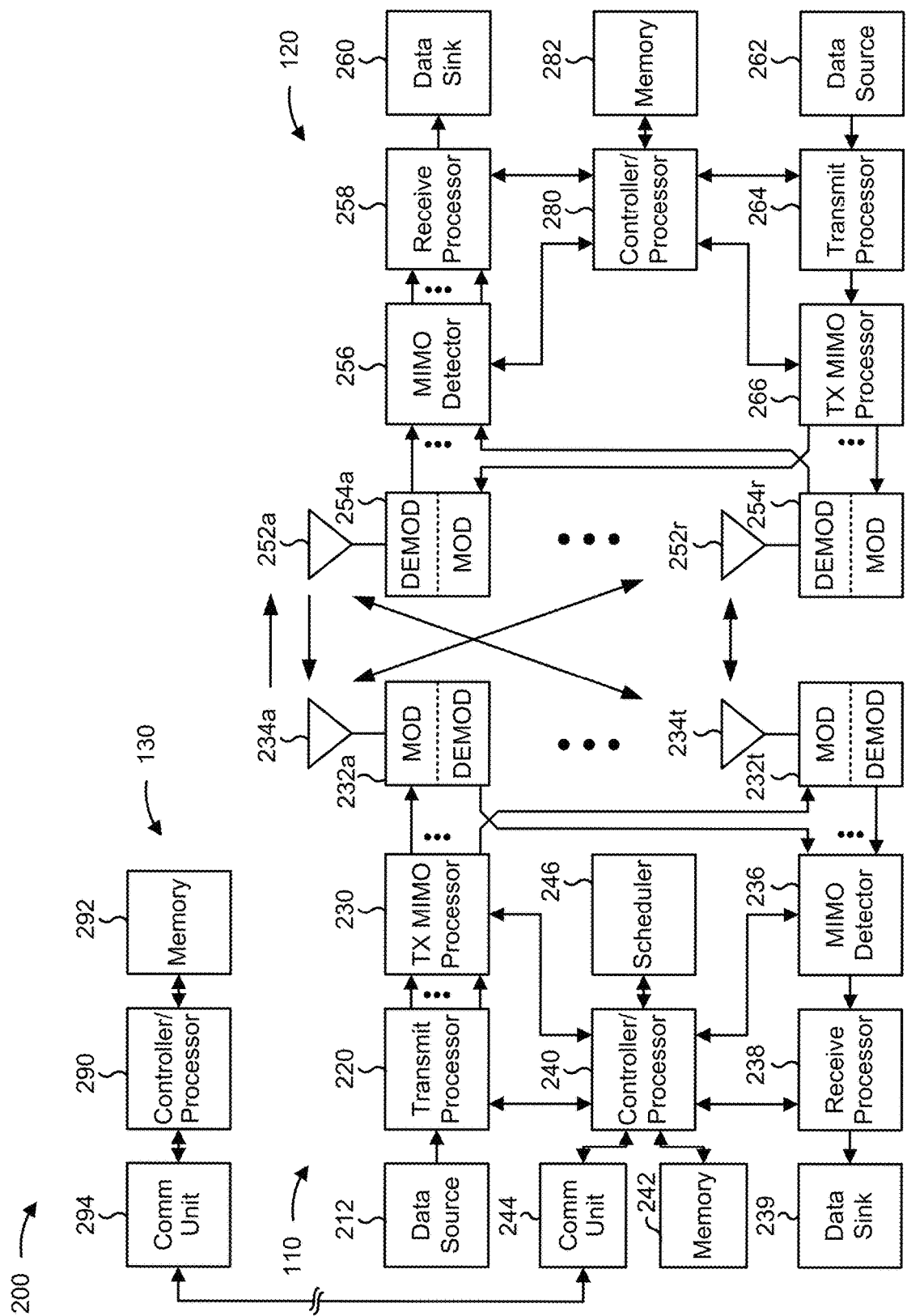
FIG. 2 is a block diagram illustrating an example base station (BS) in communication with a user equipment (UE) in a wireless network in accordance with various aspects of the present disclosure.

FIG. 2 is a block diagram 200 illustrating an example base station (BS) in communication with a user equipment (UE) in a wireless network in accordance with various aspects of the present disclosure. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode)

the data for each UE based at least in part on the MCS(s) selected for the UE, and provide data symbols for all UEs. Transmit processor 220 may also process system information (for example, for semi-static resource partitioning information (SRPI) or the like, or combinations thereof) and control information (for example, CQI requests, grants, upper layer signaling, or the like, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM or the like, or combinations thereof) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM or the like, or combinations thereof) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), or the like, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, CQI, or the like, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), orthogonal frequency division multiplexing (OFDM) with a cyclic prefix (CP) (CP-OFDM), or the like, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with HARQ process identification for IIoT, as described in more detail elsewhere herein. For example, controller/processor 240 of base station 110, controller/processor 280 of UE 120, or any other component(s) of FIG. 2 may perform or direct operations of, for example, process 800 of FIG. 8, process 900 of FIG. 9, or other processes as described herein. Memories 242 and 282 may store data and program codes for base station 110 and UE 120, respectively. A scheduler 246 may schedule UEs for data transmission on the downlink or uplink.

In some aspects, a receiver, such as a BS 110 or a UE 120, may include means for identifying a HARQ process, from one or more HARQ processes configured for a delay-constrained time cycle, for a data communication received from a transmitter in the delay-constrained time cycle, a quantity of the one or more HARQ processes being based at least in part on a quantity of data communications that the receiver is to receive from a transmitter during the delay-constrained time cycle, means for transmitting, to the transmitter and based at least in part on the data communication, HARQ feedback associated with the HARQ process, or the like, or combinations thereof. In some aspects, such means may include one or more components of BS 110 or UE 120 described in connection with FIG. 2.

In some aspects, a transmitter, such as a BS 110 or a UE 120, may include means for transmitting, to a receiver, a data communication in a delay-constrained time cycle, means for receiving, for the data communication, HARQ feedback associated with a HARQ process from one or more HARQ processes configured for the delay-constrained time cycle, a quantity of the one or more HARQ processes being based at least in part on a quantity of data communications that the transmitter is to transmit to the receiver during the delay-constrained time cycle, or the like, or combinations thereof. In some aspects, such means may include one or more components of BS 110 or UE 120 described in connection with FIG. 2.

Figure 3A:
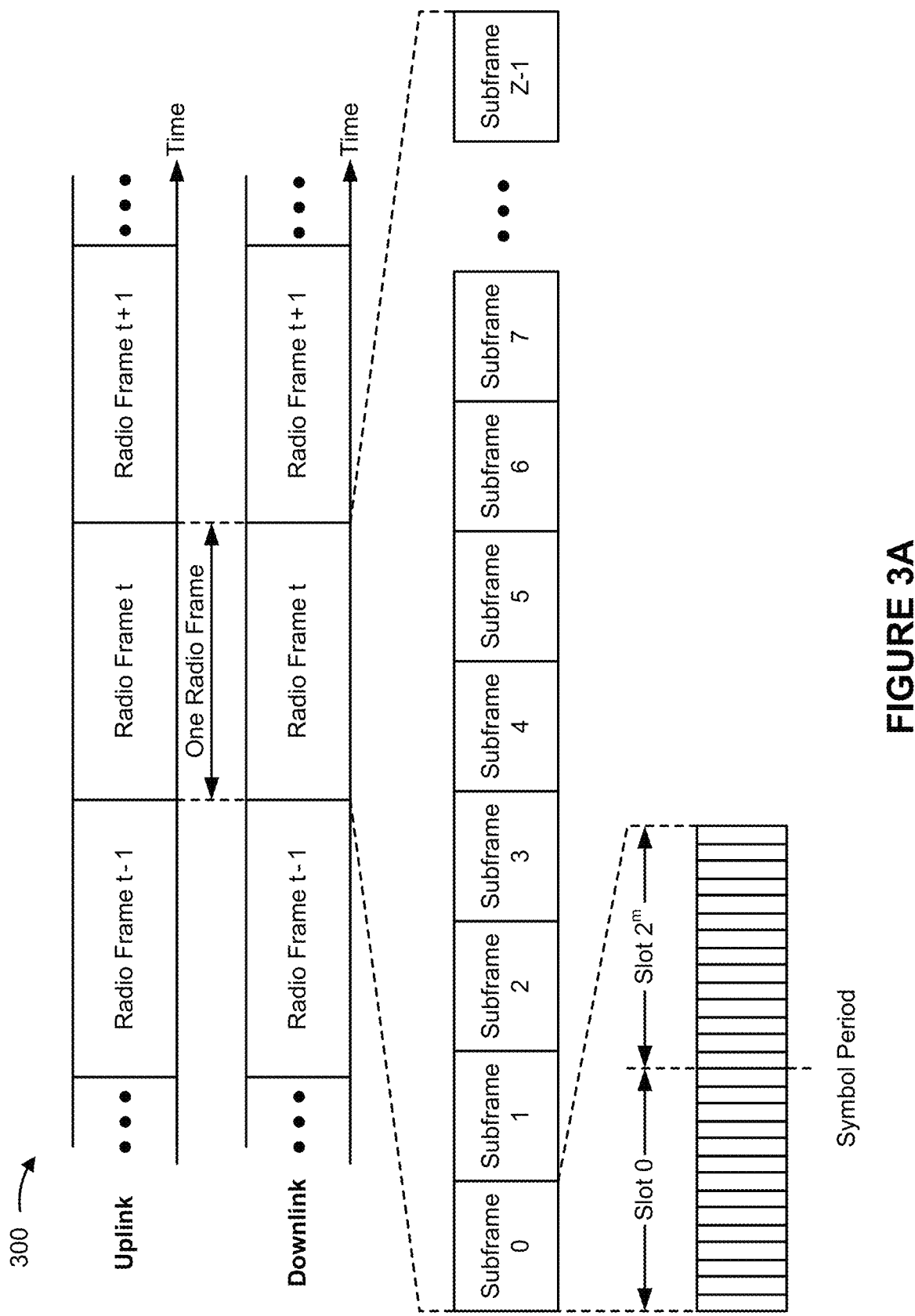
FIG. 3A is a block diagram illustrating an example frame structure for use in a wireless network in accordance with various aspects of the present disclosure.

FIG. 3A is a block diagram illustrating an example frame structure 300 for use in a wireless network in accordance with various aspects of the present disclosure. For example, frame structure 300 may be used for frequency division duplexing (FDD) in a telecommunications system (for example, NR). The transmission timeline for each of the downlink and uplink directions may be partitioned into units of radio frames (sometimes referred to simply as "frames"). Each radio frame may have a predetermined duration (for example, 10 milliseconds (ms)) and may be partitioned into a set of Z (Z≥1) subframes (for example, with indices of 0 through Z−1). Each subframe may have a predetermined duration (for example, 1 ms) and may include a set of slots (for example, $2^m$ slots per subframe are shown in FIG. 3A, where m is numerology used for a transmission, such as 0, 1, 2, 3, 4, or the like, or combinations thereof). Each slot may include a set of L symbol periods. For example, each slot may include fourteen symbol periods (for example, as shown in FIG. 3A), seven symbol periods, or another quantity of symbol periods. In a case where the subframe includes two slots (for example, when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, or the like, or combinations thereof.

While some techniques are described herein in connection with frames, subframes, slots, or the like, or combinations thereof, these techniques may equally apply to other types of wireless communication structures, which may be referred to using terms other than "frame," "subframe," "slot," or the like, or combinations thereof in 5G NR. In some aspects, a wireless communication structure may refer to a periodic time-bounded communication unit defined by a wireless communication standard or protocol. Additionally or alternatively, different configurations of wireless communication structures than those shown in FIG. 3A may be used.

In some telecommunications (for example, NR), a base station may transmit synchronization signals. For example, a base station may transmit a primary synchronization signal (PSS), a secondary synchronization signal (SSS), or the like, or combinations thereof, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, or the PBCH in accordance with a synchronization communication hierarchy (for example, a synchronization signal (SS) hierarchy) including multiple synchronization communications (for example, SS blocks), as described below in connection with FIG. 3B.

Figure 3B:
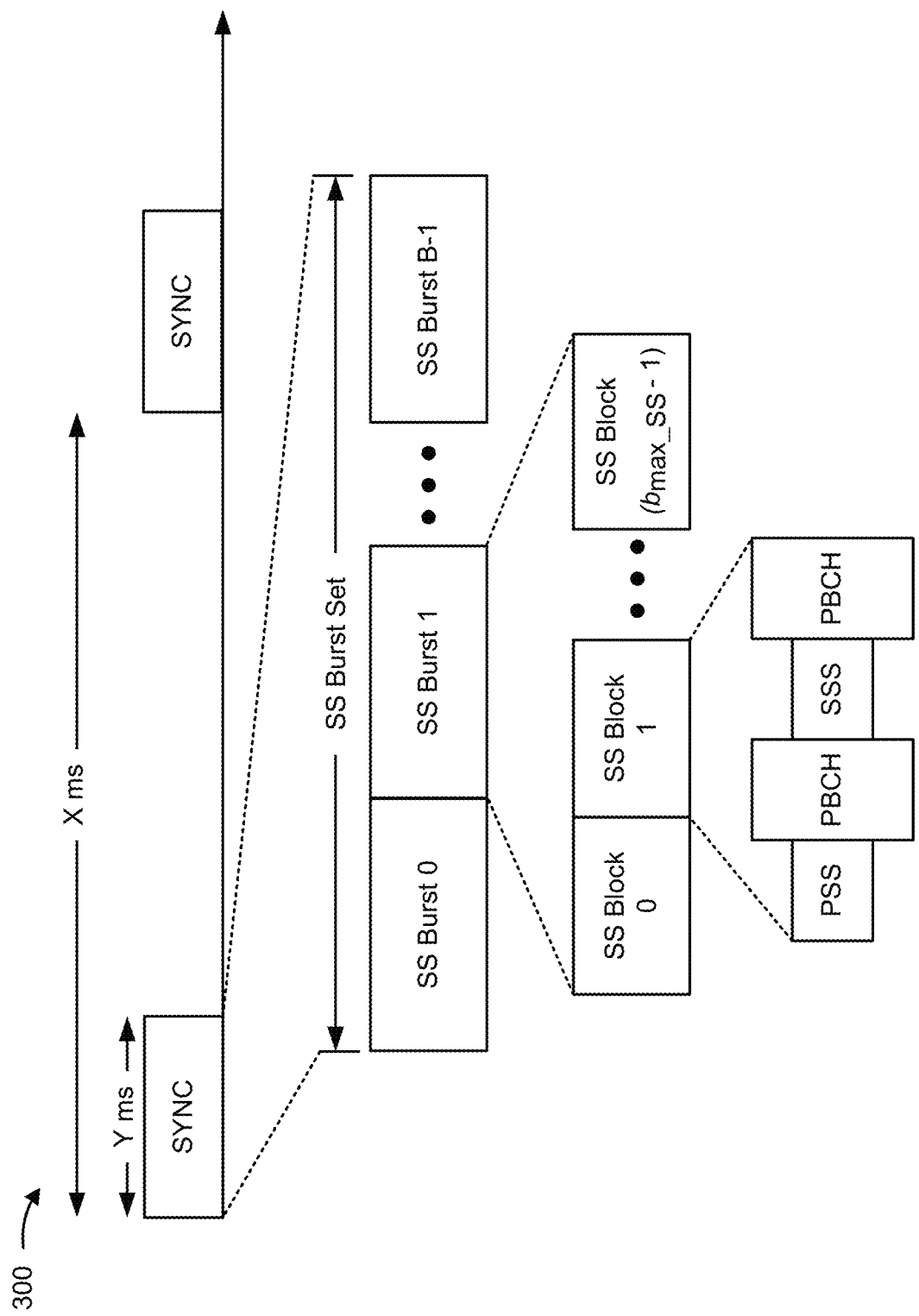
FIG. 3B is a block diagram illustrating an example synchronization communication hierarchy for use in a wireless communication network in accordance with various aspects of the present disclosure.

FIG. 3B is a block diagram illustrating an example synchronization communication hierarchy for use in a wireless communication network in accordance with various aspects of the present disclosure. The SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum quantity of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum quantity of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, or other synchronization signals (for example, a tertiary synchronization signal (TSS)) or synchronization channels. In some aspects, multiple SS blocks are included in an SS burst, and the PSS, the SSS, or the PBCH may be the same across each SS block of the SS burst. In some aspects, a single SS block may be included in an SS burst. In some aspects, the SS block may be at least four symbol periods in length, where each symbol carries one or more of the PSS (for example, occupying one symbol), the SSS (for example, occupying one symbol), or the PBCH (for example, occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (for example, consecutive symbol periods) during one or more slots. Additionally or alternatively, one or more SS blocks of the SS burst may be transmitted in non-consecutive radio resources.

In some aspects, the SS bursts may have a burst period during which the SS blocks of the SS burst are transmitted by the base station in accordance with the burst period. In other words, the SS blocks may be repeated during each SS burst. In some aspects, the SS burst set may have a burst set periodicity, and the SS bursts of the SS burst set are transmitted by the base station in accordance with the fixed burst set periodicity. In other words, the SS bursts may be repeated during each SS burst set.

The base station may transmit system information, such as system information blocks (SIBs) on a physical downlink shared channel (PDSCH) in some slots. The base station may transmit control information/data on a physical downlink control channel (PDCCH) in C symbol periods of a slot, where C may be configurable for each slot. The base station may transmit traffic data or other data on the PDSCH in the remaining symbol periods of each slot.

As indicated above, as the quantity of devices (such as sensors, actuators, PLCs, UEs, or the like) in an IIoT deployment increases, the amount of overhead consumed by control signaling in the IIoT deployment may cause an increase in latency in the IIoT deployment, may cause a decrease in an ability to meet reliability requirements of the IIoT deployment, or the like. One type of signaling that may cause an inefficient consumption of overhead in an IIoT deployment may include signaling associated with configuring and tracking HARQ feedback in an IIoT deployment. In some cases, a transmitter (such as a UE or a BS) may provide, to a receiver (such as a UE or a BS), feedback associated with a data communication that was received from the transmitter. The feedback may include, for example, HARQ feedback (such as an ACK or a NACK for the data communication). The BS may configure a plurality of HARQ processes that may be used by the UE and the BS for tracking HARQ feedback on a downlink and an uplink. The use of a plurality of HARQ processes may be used to reduce delays between the transmission of subsequent data communications in that, while a receiver is decoding a data communication and determining HARQ feedback for a HARQ process, the transmitter may concurrently transmit another data communication associated with another HARQ process. This permits back-to-back scheduling of data communication transmissions where a transmitter would typically have to wait to receive an ACK for a transmitted data communication before transmitting another data communication.

While the use of a plurality of HARQ processes may reduce the delay between transmissions of data packets, the quantity of bits needed to track HARQ process identifiers associated with each HARQ process consumes a large amount of signaling overhead, such as signaling overhead in downlink control information (DCI). As a result, the increased size of DCI may cause an increase in latency and a decrease in reliability in an IIoT deployment (for example, fewer DCI communications and corresponding data packets may be sent in an IIoT time cycle, the decoding time of decoding DCI communications may increase, or the like). This can cause issues with the latency and reliability requirements of an IIoT deployment, which in turn may cause dropped data communications and/or other issues.

Some aspects described herein provide techniques and apparatuses for HARQ process identification. Some aspects described herein may be implemented in various in scenarios in which packets are transmitted and received with delay constrains, such as IIoT and other such scenarios. In some aspects, a delay-constrained time cycle may be self-contained in that the transmission (or retransmission) of a data communication, that is to be transmitted in the delay-constrained time cycle, is contained within the delay-constrained time cycle and does not span more than the delay-constrained time cycle. Accordingly, to reduce the signaling overhead of implementing HARQ in a delay-constrained deployment, a BS may determine a quantity of HARQ processes that is to be configured for a delay-constrained time cycle based at least in part on a quantity of data communications that a transmitter (such as the BS or the UE) is to transmit to a receiver (such as the BS or the UE) in the delay-constrained time cycle. This is possible because transmissions (or retransmissions) of data communications are to commence and complete in the same delay-constrained time cycle, which means that the receiver and transmitter do not have to track the same HARQ process for a data communication across a plurality of delay-constrained time cycles. Thus, the quantity of HARQ processes needed in the delay-constrained deployment for a receiver may be configured by the transmitter to be the same as the quantity of data transmissions that the transmitter is to transmit to the receiver in a single delay-constrained time cycle. Accordingly, because the quantity of data transmissions in a given delay-constrained time cycle may be small relative to the quantity of transmissions that the transmitter and receiver may track in a non-delay-constrained deployment, configuring the quantity of HARQ processes based at least in part on the quantity of data communications to be transmitted by the transmitter to the receiver in an delay-constrained time cycle may reduce (or eliminate) the overhead of configuring and tracking HARQ in a delay-constrained deployment, which improves reliability in the delay-constrained deployment.

Figure 4:
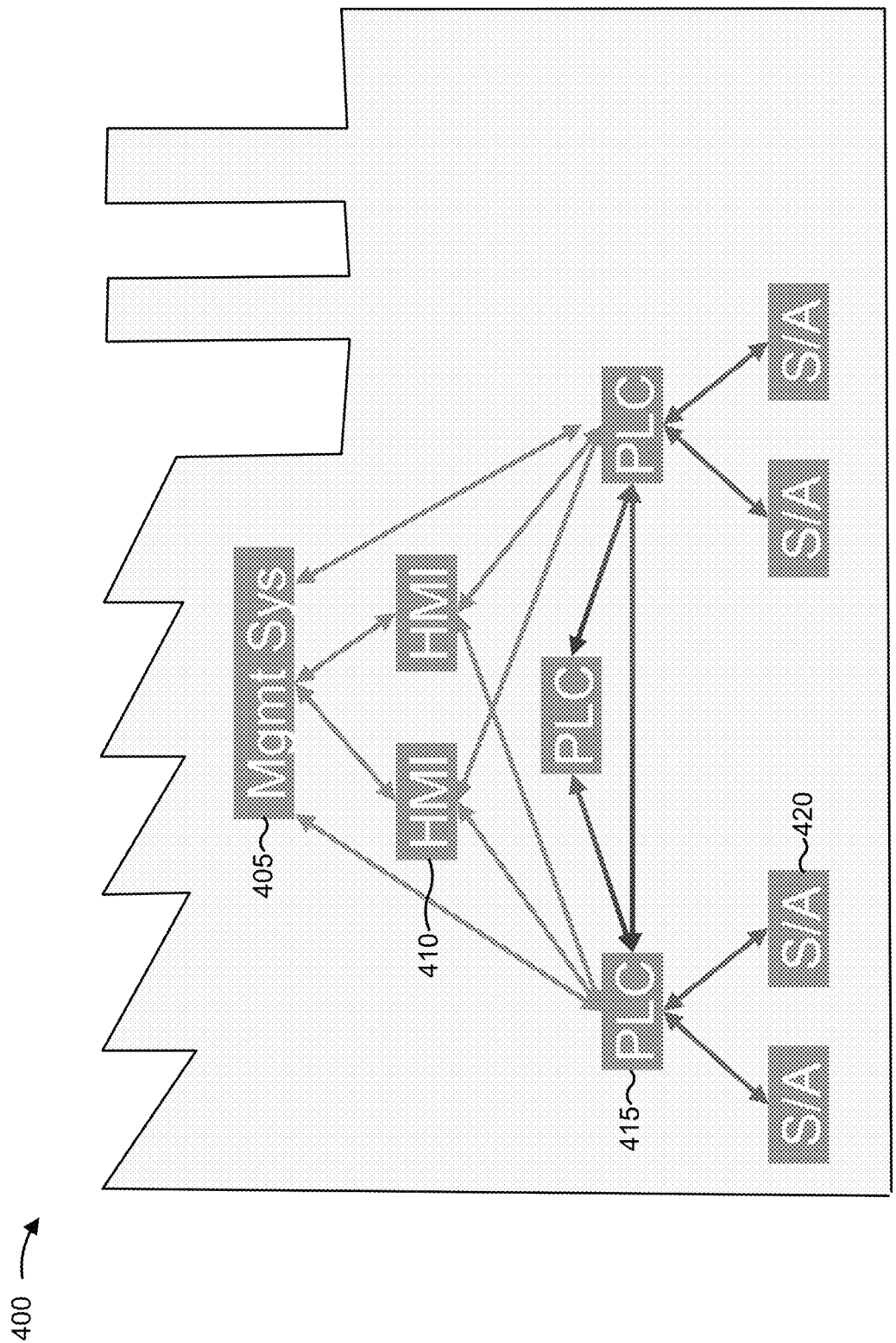
FIG. 4 is a diagram illustrating an example of a delay-constrained deployment, in accordance with various aspects of the present disclosure.

FIG. 4 is a diagram 400 illustrating an example of a delay-constrained deployment, in accordance with various aspects of the present disclosure. In some aspects, delay-constrained deployment 400 may be an IIoT deployment or another type of deployment in which packets are transmitted and received with delay constraints. As shown, delay-constrained deployment 400 may include a management system 405, one or more human-machine interfaces (HMIs) 410, one or more programmable logic circuits (PLCs) 415, and one or more sensor/actuators (S/As) 420.

Management system 405 may include a computer, such as an industrial personal computer or network controller 130, among other possibilities/examples. Management system 405 may perform controller programming, software and security management, or long-term key performance indicator (KPI) monitoring, among other possibilities/examples. In some aspects, management system 405 may perform one or more of the operations described herein as being performed by network controller 130.

HMI 410 may include a user device, such as a tablet computer, a laptop computer, a wearable device (such as a smart wristwatch or smart eyeglasses, among other possibilities/examples), a mobile phone, a virtual reality device, or an augmented reality device, among other possibilities/examples. HMI 410 may provide for control of machines (for example, S/A 420) at a factory-floor level. In some aspects, HMI 410 may provide for changing an operational mode of an S/A 420.

PLC 415 may include a processor (such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component). PLC 415 may be associated with a BS 110 that communicates with S/A 520 using uplink/downlink communications. In some aspects, PLC 415 may be associated with a UE 120 that communicates with S/A 420 using sidelink communications. In some aspects, PLC 415 may issue commands and receive sensor inputs in real-time or near real-time from S/A 420. In some aspects, PLCs 415 and management system 405 may be associated with a backhaul, such as a wireless or wireline backhaul.

S/A 420 may include a sensor, an actuator, or another type of IIoT device. For example, S/A 420 may be a sensor or actuator, such as a rotary motor, a linear servo, or a position sensor, among other possibilities/examples. In some aspects, S/A 520 may include a UE 120, may be included in a UE 120, or may be associated with a UE 120 (such that S/A 420 communicates with UE 120 using sidelink communications). In some aspects, S/A 420 may be associated with a radio interface via which to communicate with a given PLC 415. The radio interface may be scheduled by a BS 110 associated with PLC 415 and/or configured based at least in part on configuration information provided by management system 405. In some aspects, the radio interface may carry data communications between S/A 420 (or an associated UE 120) and a BS 110, such as a data communication carrying a status update report associated with an S/A 420 or a data communication carrying sensor measurements associated with an S/A 420, among other possibilities/examples. Moreover, the radio interface may carry HARQ feedback associated with the data communications between S/A 420 (or an associated UE 120) and a BS 110, such as an ACK associated with a data communication (which may be an indication that the data communication was successfully received and decoded) or a NACK associated with a data communication (which may be an indication that the data communication was not successfully decoded).

Figure 5A:
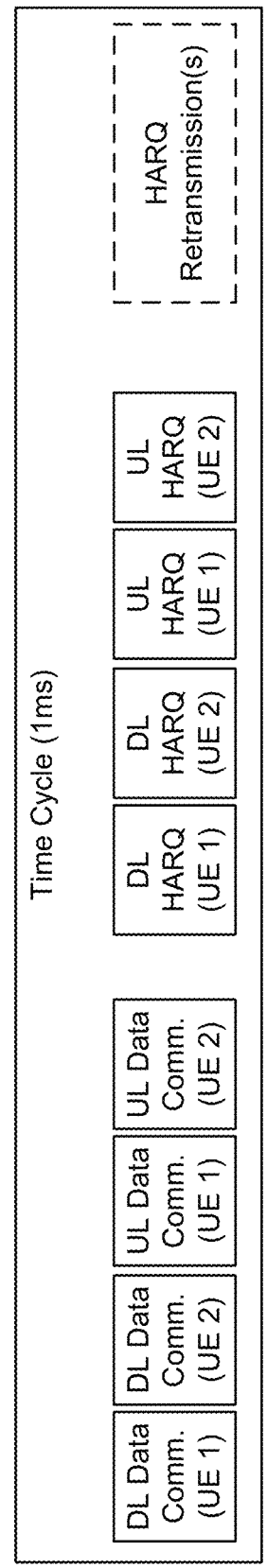
FIGS. 5A and 5B are diagrams illustrating examples of delay-constrained time cycles, in accordance with various aspects of the present disclosure.
Figure 5B:
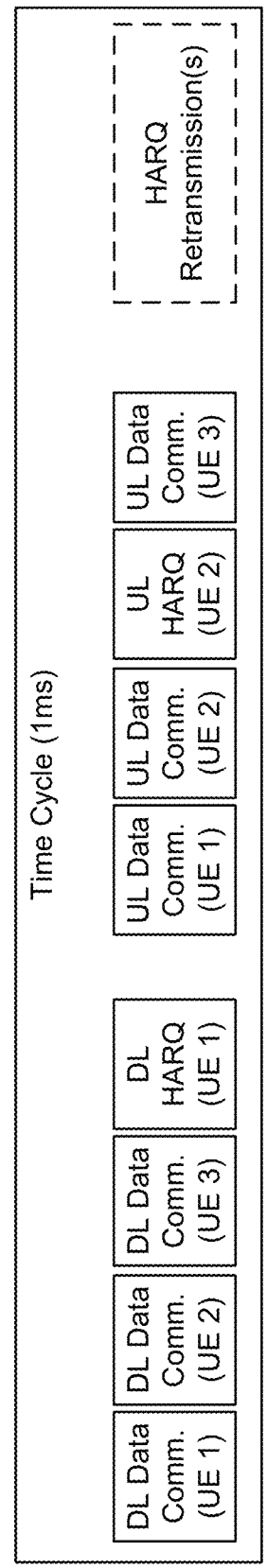

FIGS. 5A and 5B are diagrams 500 illustrating examples of delay-constrained time cycles, in accordance with various aspects of the present disclosure. Other delay-constrained time cycles may be used with the techniques described herein. A delay-constrained time cycle may include a time duration (such as 1ms or another example time duration) in which various communications are transmitted via a radio interface between a BS (such as BS 110) and one or more UEs (such as UE 120). The BS and the one or more UEs may be associated with a delay-constrained deployment, such as the example delay-constrained deployment illustrated in FIG. 4 or another type of delay-constrained deployment. In some aspects, the delay-constrained deployment is an IIoT deployment, in which case the example delay-constrained time cycles may be IIoT time cycles.

In some aspects, the delay-constrained time cycle may include one or more symbols, one or more slots, or a combination thereof, in which the BS may transmit one or more downlink data communications to the one or more UEs and the one or more UEs may transmit one or more uplink data communications to the BS. Moreover, the one or more UEs may transmit, in the delay-constrained time cycle, HARQ feedback (such as an ACK or a NACK) for the one or more downlink data communications, and the BS may transmit, in the delay-constrained time cycle, HARQ feedback for the one more uplink data communications.

As an example of the above, FIG. 5A illustrates an example of a delay-constrained time cycle in which a BS communicates with a plurality of UEs, such as UE 1 and UE 2. As shown in FIG. 5A, the BS may transmit a downlink data communication to UE 1 and a downlink data communication to UE 2 in the delay-constrained time cycle. Additionally, in the same delay-constrained time cycle, UE 1 may transmit an uplink data communication to the BS and UE 2 may transmit an uplink data communication to the BS. In the example illustrated in FIG. 5A, HARQ processes are configured on the uplink and downlink for both UE 1 and UE 2. Accordingly, the BS may transmit, in the same delay-constrained time cycle, HARQ feedback for the uplink data communication received from UE 1 and HARQ feedback for the uplink data communication received from UE 2. Moreover, again in the same delay-constrained time cycle, UE 1 may transmit HARQ feedback for the downlink data communication received from the BS and UE 2 may transmit HARQ feedback for the downlink data communication received from the BS.

FIG. 5B illustrates another example of a delay-constrained time cycle in which a BS communicates with a plurality of UEs, such as UE 1, UE 2, and UE 3. As shown in FIG. 5B, the BS may transmit a downlink data communication to UE 1, a downlink data communication to UE 2, and a downlink data communication to UE 3 in the delay-constrained time cycle. In the same delay-constrained time cycle, UE 1 may transmit an uplink data communication to the BS, UE 2 may transmit an uplink data communication to the BS, and UE 3 may transmit an uplink data communication to the BS. In the example illustrated in FIG. 5B, HARQ processes are configured on the uplink for UE 1 and on the downlink for UE 2. Accordingly, in the same delay-constrained time cycle, the BS may transmit HARQ feedback for the uplink data communication received from UE 2, and UE 1 may transmit HARQ feedback for the downlink data communication received from the BS.

In some cases, HARQ retransmissions may be performed in the same delay-constrained time cycle for data communications for which a NACK was received. However, an IIoT time cycle may be self-contained in that, if a data communication that is to be transmitted in the delay-constrained time cycle cannot be decoded within the time allotment for the delay-constrained time cycle, or if a retransmission of the data communication cannot be performed within the time allotment for the delay-constrained time cycle, the data communication is dropped and is not retransmitted in the next delay-constrained time cycle. In other words, a delay-constrained time cycle may be self-contained in that the transmission (or retransmission) of a data communication that is to be transmitted in the delay-constrained time cycle is contained within the delay-constrained time cycle and does not span more than the delay-constrained time cycle.

Figure 6A:
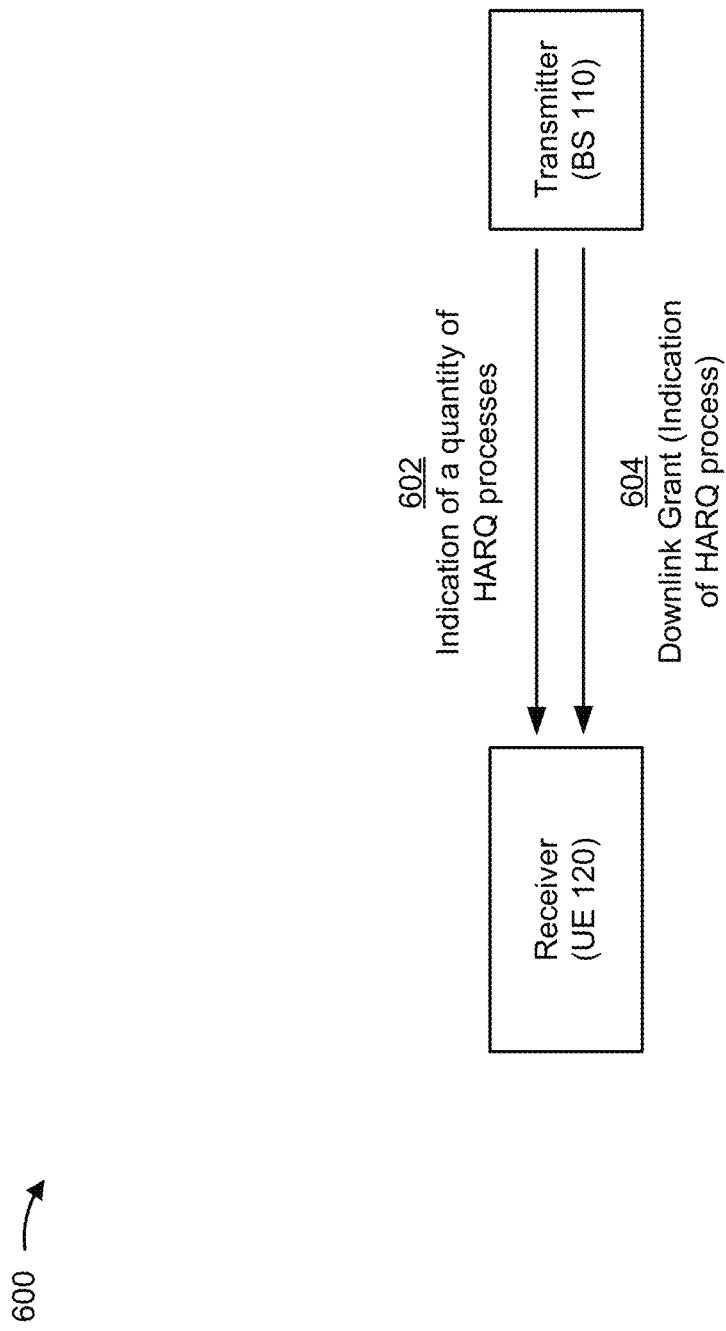
FIGS. 6A-7B are diagrams illustrating one or more examples of hybrid automatic repeat request (HARD) process identification in accordance with various aspects of the present disclosure.
Figure 6B:
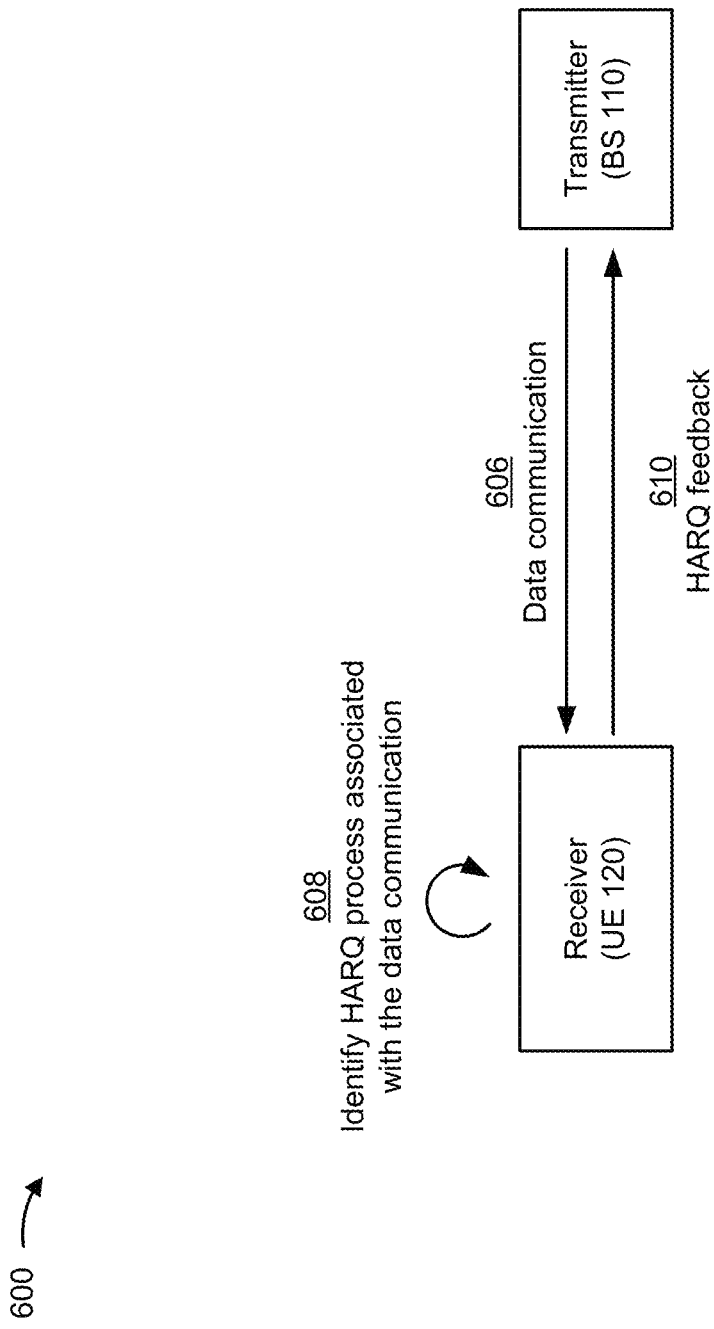

FIGS. 6A and 6B are diagrams 600 illustrating one or more examples of HARQ process identification in accordance with various aspects of the present disclosure. The operations shown in FIGS. 6A and 6B are described as being performed by a receiver, such as a UE 120, and a transmitter, such as a BS 110. In some aspects, UE 120 and BS 110 may be associated with a delay-constrained deployment, such as the example delay-constrained deployment illustrated in FIG. 4 or another type of delay-constrained deployment. In some aspects, the delay-constrained deployment may be an IIoT deployment. In some aspects, UE 120 and BS 110 may communicate via a radio interface of a wireless network, such as wireless network 100.

In some aspects, the receiver and the transmitter may communicate in one or more delay-constrained time cycles, such as the example delay-constrained time cycle illustrated in FIG. 5 or another type of delay-constrained time cycle. In this case, the transmitter may configure one or more HARQ processes for transmitting data communications in a delay-constrained time cycle. In some aspects, the one or more delay-constrained time cycles may be one or more IIoT time cycles.

As shown in FIG. 6A, and in a first operation 602, to configure the one or more HARQ processes, the transmitter may transmit an indication of a quantity of HARQ processes to the receiver. The quantity of HARQ processes may be the quantity of HARQ processes that is to be used in each delay-constrained time cycle for tracking HARQ feedback for downlink data communications transmitted by the transmitter to the receiver.

As indicated above, a delay-constrained time cycle may be self-contained in that the transmission (or retransmission) of a data communication that is to be transmitted in the delay-constrained time cycle is contained within the delay-constrained time cycle and does not span more than the delay-constrained time cycle. Accordingly, to reduce the signaling overhead of implementing HARQ in the delay-constrained deployment, the transmitter may determine the quantity of HARQ processes based at least in part on a quantity of data communications that the transmitter is to transmit to the receiver in a delay-constrained time cycle. This is possible because transmissions (or retransmissions) of data communications are to commence and complete in the same delay-constrained time cycle, which means that the receiver and transmitter do not have to track the same HARQ process for a data communication across a plurality of delay-constrained time cycles. Thus, the quantity of HARQ processes needed in the delay-constrained deployment for a receiver may be configured by the transmitter to be the same as the quantity of downlink data transmissions that the transmitter is to transmit to the receiver in a single delay-constrained time cycle.

In some aspects, the transmitter may indicate the quantity of HARQ processes to the receiver in one or more signaling communications, such as a DCI communication, a radio resource control (RRC) communication, or a medium access control (MAC) control element (MAC-CE) communication, among other possibilities/examples. In some aspects, the indication of the quantity of HARQ processes may include an indication of a quantity of bits that are reserved for identifying HARQ processes in a downlink grant. In other words, the greater the quantity of bits, the greater the quantity of HARQ processes, and the fewer the quantity of bits, the fewer the quantity of HARQ processes. For example, 0 bits being reserved may indicate that 1 HARQ process is configured, 2 bits being reserved may indicate that 4 HARQ processes are configured, 4 bits being reserved may indicate that 16 HARQ processes are configured, among other possibilities/examples. Accordingly, configuring the quantity of HARQ processes based at least in part on the quantity of data communications to be transmitted by the transmitter to the receiver in a delay-constrained time cycle may reduce (or eliminate) the quantity of bits that are reserved for identifying HARQ processes in a downlink grant, which reduces the size of the downlink grant and improves reliability of the downlink grant.

In some aspects, the transmitter may explicitly indicate the quantity of HARQ processes to the receiver. For example, the one or more signaling communications may specify the quantity of bits that are reserved for identifying HARQ processes in a downlink grant. In this case, the receiver may determine the quantity of HARQ processes based at least in part on the explicit indication of the quantity of bits in the one or more signaling communications.

In some aspects, the transmitter may implicitly indicate the quantity of HARQ processes to the receiver. For example, the one or more signaling communications may indicate that the receiver is to operate in a particular mode, such as an IIoT mode or similar mode. The IIoT mode or similar mode may be associated with the quantity of bits that are reserved for identifying HARQ processes in a downlink grant. Accordingly, the receiver may determine the quantity of HARQ processes based at least in part on identifying the indication of the IIoT mode or similar mode and identifying that the IIoT mode or similar mode is associated with the quantity of bits.

As another example, the implicit indication may include an indication of a formula or algorithm for determining the quantity of bits, such as floor($\log_2$ N) or ceil($\log_2$ N), where N may correspond to the quantity of data communications that the transmitter is to transmit to the receiver in a delay-constrained time cycle (which may be indicated in the one or more signaling communications or other types of communications). In this case, the receiver may determine the quantity of HARQ processes by determining the quantity of bits based at least in part on the formula or algorithm indicated in the one or more signaling communications.

In some aspects, the transmitter may configure the receiver to monitor for other types of downlink traffic (for example, traffic other than data communications that are transmitted in delay-constrained time cycles), such as enhanced mobile broadband (eMBB) traffic, URLLC traffic, or other types of downlink traffic. In this case, the implicit indication may include an indication of an overall quantity of bits configured for all types of downlink traffic, and the receiver may identify a first subset of the overall quantity of bits that are to be used for the HARQ processes for the delay-constrained deployment and a second subset of the overall quantity of bits that are to be used for the HARQ processes for other types of downlink traffic. In some aspects, the receiver may determine the first subset of the overall quantity of bits based at least in part on the quantity of data communications that the transmitter is to transmit to the receiver in a delay-constrained time cycle (which may be indicated in the one or more signaling communications or other types of communications).

As further shown in FIG. 6A, and in a second operation 604, the transmitter may transmit a downlink grant to the receiver. The downlink grant may include a dynamic grant, a semi-persistent scheduling grant, a configured grant, or another type of downlink grant that schedules the downlink transmission of a data communication in a delay-constrained time cycle. The downlink grant may be included in a DCI communication, an RRC communication, a MAC-CE communication, or another type of signaling communication. If the downlink grant is included in a DCI communication, the DCI communication may include a format 1_1 DCI communication (sometimes referred to as a full DL DCI), a format 1_0 DCI communication (sometimes referred to as a fallback DL DCI), or a DCI communication of another format.

In some aspects, if the quantity of HARQ processes configured for the receiver on the downlink in the delay-constrained time cycle is greater than one, the downlink grant may include an indication of a HARQ process, from a plurality of HARQ processes configured for the receiver on the downlink in the delay-constrained time cycle, associated with the data communication. The indication of the HARQ process may include a HARQ process identifier or another type of identifier. The HARQ process identifier may be indicated by one or more bits in the signaling communication that includes the downlink grant. As indicated above, the quantity of the one or more bits may be based at least in part on the quantity of data communications that the transmitter is to transmit to the receiver in the delay-constrained time cycle.

In some aspects, if the quantity of HARQ processes configured for the receiver on the downlink in the delay-constrained time cycle is one, the downlink grant itself may serve as an indication of the HARQ process. In this case, no bits are reserved for the HARQ process identifier in the signaling communication that includes the downlink grant.

As shown in FIG. 6B, and in a third operation 606, the transmitter may transmit, to the receiver, the data communication scheduled by the downlink grant. For example, the transmitter may transmit the data communication during the delay-constrained time cycle. In some aspects, the transmitter may transmit the data communication on a downlink channel, such as a physical downlink shared channel (PDSCH) or another type of downlink channel.

As further shown in FIG. 6B, and in a fourth operation 608, the receiver may receive the data communication in the delay-constrained time cycle and may identify a HARQ process associated with the data communication. In some aspects, if the quantity of HARQ processes configured for the receiver on the downlink in the delay-constrained time cycle is one, the receiver may identify the HARQ process based at least in part on receiving the downlink grant for the data communication. In other words, if no bits are reserved for the HARQ process identifier in the signaling communication that includes the downlink grant, the receiver may determine that one HARQ process is configured for the delay-constrained time cycle, and may determine that the HARQ process is associated with the data communication.

In some aspects, if the quantity of HARQ processes configured for the receiver on the downlink in the delay-constrained time cycle is greater than one, the receiver may receive the signaling communication that includes the downlink grant and may identify the HARQ process, associated with the data communication, based at least in part on an indication of the HARQ process in the signaling communication. As indicated above, the indication of the HARQ process may include one or more bits that are reserved for indicating a HARQ process identifier or another similar identifier associated with the HARQ process. Accordingly, the receiver may identify the HARQ process by identifying the HARQ process identifier, associated with the HARQ process, indicated in the signaling communication. In some aspects, the HARQ process identifier may be based at least in part on a transmission timing of the data communication in the delay-constrained time cycle. For example, the HARQ process identifier may correspond to a slot number in which the data communication is to be transmitted, may correspond to a symbol number in which the data communication is to be transmitted, or the like.

As further shown in FIG. 6B, and in a fifth operation 610, the receiver may transmit HARQ feedback, associated with the HARQ process, for the data communication. The receiver may transmit the HARQ feedback in the delay-constrained time cycle in which the data communication was transmitted. The HARQ feedback may include an indication of the HARQ process identifier associated with the HARQ process associated with the data communication (if the quantity of HARQ processes configured for the receiver on the downlink in the delay-constrained time cycle is greater than one), or the HARQ process may itself be an indication of the HARQ process associated with the data communication (if the quantity of HARQ processes configured for the receiver on the downlink in the delay-constrained time cycle is one). In some aspects, the identifier of the HARQ process in the HARQ feedback may be implicit based on the ordering or position of the HARQ feedback bits. For example, if ACK/NACK bits for all the DL HARQ processes are transmitted in a single UL transmission, the N-th ACK/NACK bit may correspond to the N-th HARQ process. In another example, the ACK/NACK bit for the N-th DL HARQ process may be transmitted together with the N-th UL HARQ process transmission (for example, as UCI multiplexed on PUSCH). Other examples involving a hybrid combination of the above two examples are also possible (for example, when the ACK/NACK bits are transmitted in multiple separate UL transmissions, but at least one of these UL transmissions carries more than one of the ACK/NACK bits). The HARQ feedback may include an ACK for the data communication (for example, if the receiver successfully decoded the data communication) or a NACK for the data communication (for example, if the receiver was not able to successfully decode the data communication). If the HARQ feedback includes a NACK, the transmitter may perform a retransmission of the data communication in the same delay-constrained time cycle.

In this way, to reduce the signaling overhead of implementing HARQ in a delay-constrained deployment, the transmitter may determine a quantity of HARQ processes that is to be configured for a delay-constrained time cycle based at least in part on a quantity of data communications that the transmitter is to transmit to the receiver in the delay-constrained time cycle. This is possible because transmissions (or retransmissions) of data communications are to commence and complete in the same delay-constrained time cycle, which means that the receiver and transmitter do not have to track the same HARQ process for a data communication across a plurality of delay-constrained time cycles. Thus, the quantity of HARQ processes needed in the delay-constrained deployment for a receiver may be configured by the transmitter to be the same as the quantity of downlink data transmissions that the transmitter is to transmit to the receiver in a single delay-constrained time cycle. Accordingly, because the quantity of downlink data transmissions in a given delay-constrained time cycle may be small relative to the quantity of downlink transmissions that the transmitter and receiver may track in a non-delay-constrained deployment, configuring the quantity of HARQ processes based at least in part on the quantity of data communications to be transmitted by the transmitter to the receiver in a delay-constrained time cycle may reduce (or eliminate) the overhead of configuring and tracking HARQ in a delay-constrained deployment, which improves reliability in the delay-constrained deployment.

Figure 7A:
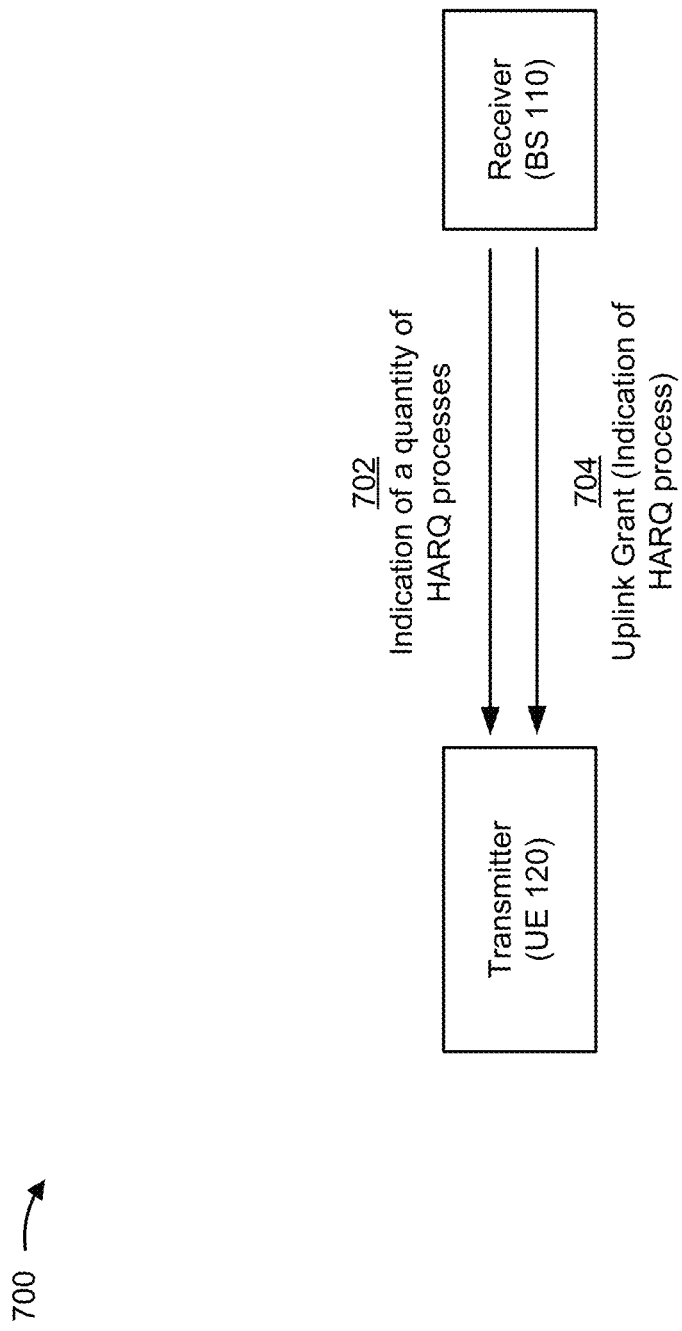
Figure 7B:
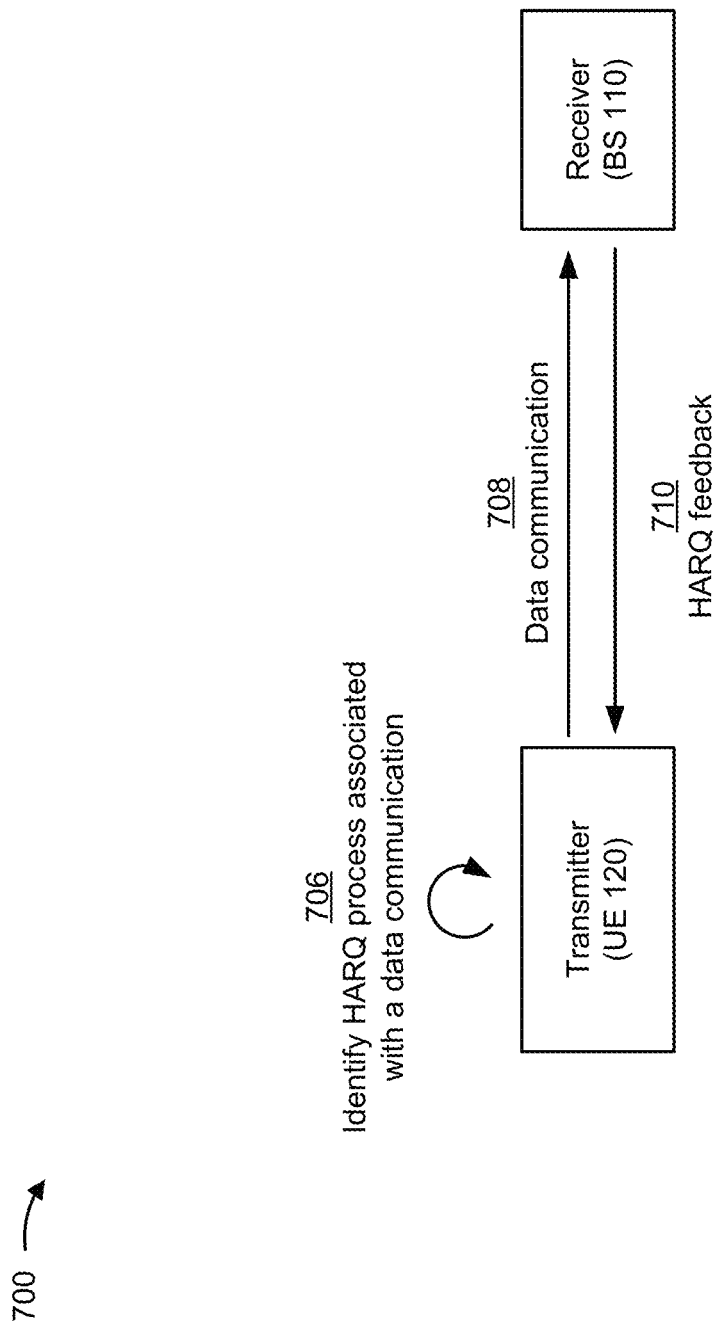

FIGS. 7A and 7B are diagrams 700 illustrating one or more examples of HARQ process identification in accordance with various aspects of the present disclosure. The operations shown in FIGS. 7A and 7B are described as being performed by a transmitter, such as a UE 120, and a receiver, such as a BS 110. In some aspects, UE 120 and BS 110 may be associated with a delay-constrained deployment, such as the example delay-constrained deployment illustrated in FIG. 4 or another type of delay-constrained deployment. In some aspects, the delay-constrained deployment may be an IIoT deployment. In some aspects, UE 120 and BS 110 may communicate via a radio interface of a wireless network, such as wireless network 100.

In some aspects, the receiver and the transmitter may communicate in one or more delay-constrained time cycles, such as the example delay-constrained time cycle illustrated in FIGS. 5A and 5B or another type of delay-constrained time cycle. In this case, the receiver may configure one or more HARQ processes for the transmitter to transmit uplink data communications in a delay-constrained time cycle. In some aspects, the one or more delay-constrained time cycles are IIoT type cycles.

As shown in FIG. 7A, and in a first operation 702, to configure the one or more HARQ processes, the receiver may transmit an indication of a quantity of HARQ processes to the transmitter. The quantity of HARQ processes may be the quantity of HARQ processes that is to be used in each delay-constrained time cycle for tracking HARQ feedback for uplink data communications transmitted by the transmitter to the receiver.

As indicated above, a delay-constrained time cycle may be self-contained in that the transmission (or retransmission) of a data communication that is to be transmitted in the delay-constrained time cycle is contained within the delay-constrained time cycle and does not span more than the delay-constrained time cycle. Accordingly, to reduce the signaling overhead of implementing HARQ in the IIoT deployment, the receiver may determine the quantity of HARQ processes based at least in part on a quantity of data communications that the transmitter is to transmit to the receiver in a delay-constrained time cycle. This is possible because transmissions (or retransmissions) of data communications are to commence and complete in the same delay-constrained time cycle, which means that the receiver and transmitter do not have to track the same HARQ process for a data communication across a plurality of delay-constrained time cycles. Thus, the quantity of HARQ processes needed in the delay-constrained deployment for a receiver may be configured by the receiver to be the same as the quantity of uplink data transmissions that the transmitter is to transmit to the receiver in a single delay-constrained time cycle.

In some aspects, the receiver may indicate the quantity of HARQ processes to the transmitter in one or more signaling communications, such as a DCI communication, an RRC communication, or a MAC-CE communication, among other possibilities/examples. In some aspects, the indication of the quantity of HARQ processes may include an indication of a quantity of bits that are reserved for identifying HARQ process in a uplink grant. In other words, the greater the quantity of bits, the greater the quantity of HARQ processes, and the fewer the quantity of bits, the fewer the quantity of HARQ processes. For example, 0 bits being reserved may indicate that 1 HARQ process is configured, 2 bits being reserved may indicate that 4 HARQ processes are configured, 4 bits being reserved may indicate that 16 HARQ processes are configured, among other possibilities/examples. Accordingly, configuring the quantity of HARQ processes based at least in part on the quantity of data communications to be transmitted by the transmitter to the receiver in a delay-constrained time cycle may reduce (or eliminate) the quantity of bits that are reserved for identifying HARQ processes in an uplink grant, which reduces the size of the uplink grant and improves reliability of the uplink grant.

In some aspects, the receiver may explicitly indicate the quantity of HARQ processes to the transmitter. For example, the one or more signaling communications may specify the quantity of bits that are reserved for identifying HARQ processes in an uplink grant. In this case, the transmitter may determine the quantity of HARQ processes based at least in part on the explicit indication of the quantity of bits in the one or more signaling communications.

In some aspects, the receiver may implicitly indicate the quantity of HARQ processes to the transmitter. For example, the one or more signaling communications may indicate that the transmitter is to operate in a particular mode, such as an IIoT mode or similar mode. The IIoT mode or similar mode may be associated with the quantity of bits that are reserved for identifying HARQ processes in an uplink grant. Accordingly, the transmitter may determine the quantity of HARQ processes based at least in part on identifying the indication of the IIoT mode or similar mode and identifying that the IIoT mode or similar mode is associated with the quantity of bits.

As another example, the implicit indication may include an indication of a formula or algorithm for determining the quantity of bits, such as floor($\log_2$ N) or ceil ($\log_2$ N), where N may correspond to the quantity of data communications that the transmitter is to transmit to the receiver in a delay-constrained time cycle (which may be indicated in the one or more signaling communications or other types of communications). In this case, the transmitter may determine the quantity of HARQ processes by determining the quantity of bits based at least in part on the formula or algorithm indicated in the one or more signaling communications.

In some aspects, the receiver may configure the transmitter to transmit other types of uplink traffic (for example, traffic other than data communications that are transmitted in delay-constrained time cycles), such as eMBB traffic, URLLC traffic, or other types of traffic. In this case, the implicit indication may include an indication of an overall quantity of bits configured for all types of uplink traffic, and the transmitter may identify a first subset of the overall quantity of bits that are to be used for the HARQ processes for the delay-constrained deployment and a second subset of the overall quantity of bits that are to be used for the HARQ processes for other types of uplink traffic. In some aspects, the receiver may determine the first subset of the overall quantity of bits based at least in part on the quantity of data communications that the transmitter is to transmit to the receiver in a delay-constrained time cycle (which may be indicated in the one or more signaling communications or other types of communications).

As further shown in FIG. 7A, and in a second operation 704, the receiver may transmit an uplink grant to the transmitter. The uplink grant may include a dynamic grant, a semi-persistent scheduling grant, a configured grant, or another type of uplink grant that schedules the uplink transmission of a data communication in a delay-constrained time cycle. The uplink grant may be included in a DCI communication, an RRC communication, a MAC-CE communication, or another type of signaling communication. If the uplink grant is included in a DCI communication, the DCI communication may include a format 0_1 DCI communication (sometimes referred to as a full UL DCI), a format 0_0 DCI communication (sometimes referred to as a fallback UL DCI), or a DCI communication of another DCI format.

In some aspects, if the quantity of HARQ processes configured for the transmitter on the uplink in the delay-constrained time cycle is greater than one, the uplink grant may include an indication of a HARQ process, from a plurality of HARQ processes configured for the transmitter on the uplink in the delay-constrained time cycle, associated with the data communication. The indication of the HARQ process may include a HARQ process identifier or another type of identifier. The HARQ process identifier may be indicated by one or more bits in the signaling communication that includes the uplink grant. As indicated above, the quantity of the one or more bits may be based at least in part on the quantity of data communications that the transmitter is to transmit to the receiver in the delay-constrained time cycle.

In some aspects, if the quantity of HARQ processes configured for the transmitter on the uplink in the delay-constrained time cycle is one, the uplink grant itself may serve as an indication of the HARQ process. In this case, no bits are reserved for the HARQ process identifier in the signaling communication that includes the uplink grant.

As shown in FIG. 7B, and in a third operation 706, the transmitter may receive the uplink grant and may identify a HARQ process associated with the data communication scheduled by the uplink grant. In some aspects, if the quantity of HARQ processes configured for the receiver on the uplink in the delay-constrained time cycle is one, the transmitter may identify the HARQ process based at least in part on receiving the uplink grant for the data communication. In other words, if no bits are reserved for the HARQ process identifier in the signaling communication that includes the uplink grant, the transmitter may determine that one HARQ process is configured for the delay-constrained time cycle, and may determine that the HARQ process is associated with the data communication.

In some aspects, if the quantity of HARQ processes configured for the receiver on the uplink in the delay-constrained time cycle is greater than one, the transmitter may receive the signaling communication that includes the uplink grant and may identify the HARQ process, associated with the data communication, based at least in part on an indication of the HARQ process in the signaling communication. As indicated above, the indication of the HARQ process may include one or more bits that are reserved for indicating a HARQ process identifier or another similar identifier associated with the HARQ process. Accordingly, the transmitter may identify the HARQ process by identifying the HARQ process identifier, associated with the HARQ process, indicated in the signaling communication. In some aspects, the HARQ process identifier may be based at least in part on a transmission timing of the data communication in the delay-constrained time cycle. For example, the HARQ process identifier may correspond to a slot number in which the data communication is to be transmitted, may correspond to a symbol number in which the data communication is to be transmitted, or the like.

As further shown in FIG. 7B, and in a fourth operation 708, the transmitter may transmit, to the receiver, the data communication scheduled by the uplink grant. For example, the transmitter may transmit the data communication during the delay-constrained time cycle. In some aspects, the transmitter may transmit the data communication in an uplink channel, such as a physical uplink shared channel (PUSCH) or another type of uplink channel. The data communication being transmitted in the time-domain resources and frequency-domain resources scheduled in the uplink grant is associated with the HARQ process indicated in the scheduling message (such as the UL DCI) identifying the resources granted for the uplink transmission.

As further shown in FIG. 7B, and in a fifth operation 710, the receiver may receive the data communication and may transmit HARQ feedback, associated with the HARQ process, for the data communication. The receiver may transmit the HARQ feedback in the delay-constrained time cycle in which the data communication was transmitted. The HARQ feedback may include an indication of the HARQ process identifier associated with the HARQ process associated with the data communication (if the quantity of HARQ processes configured for the receiver on the uplink in the delay-constrained time cycle is greater than one), or the HARQ process may itself be an indication of the HARQ process associated with the data communication (if the quantity of HARQ processes configured for the receiver on the uplink in the delay-constrained time cycle is one). The HARQ feedback may include an ACK for the data communication (for example, if the receiver successfully decoded the data communication) or a NACK for the data communication (for example, if the receiver was not able to successfully decode the data communication). If the HARQ feedback includes a NACK, the transmitter may perform a retransmission of the data communication in the same delay-constrained time cycle. In some aspects, instead of or in addition to an explicit ACK or NACK bit indication, the HARQ feedback may be conveyed using the new data indicator (NDI) bit, which indicates whether to transmit new data or to retransmit a redundant version of the previously transmitted data.

In this way, to reduce the signaling overhead of implementing HARQ in a delay-constrained deployment, the receiver may determine a quantity of HARQ processes that is to be configured for a delay-constrained time cycle based at least in part on a quantity of data communications that the transmitter is to transmit to the receiver in the delay-constrained time cycle. This is possible because transmissions (or retransmissions) of data communications are to commence and complete in the same delay-constrained time cycle, which means that the receiver and transmitter do not have to track the same HARQ process for a data communication across a plurality of delay-constrained time cycles. Thus, the quantity of HARQ processes needed in the delay-constrained deployment for a receiver may be configured by the receiver to be the same as the quantity of downlink data transmissions that the transmitter is to transmit to the receiver in a single delay-constrained time cycle. Accordingly, because the quantity of downlink data transmissions in a given delay-constrained time cycle may be small relative to the quantity of downlink transmissions that the transmitter and receiver may track in non-delay-constrained deployment, configuring the quantity of HARQ processes based at least in part on the quantity of data communications to be transmitted by the transmitter to the receiver in a delay-constrained time cycle may reduce (or eliminate) the overhead of configuring and tracking HARQ in a delay-constrained deployment, which improves reliability in the delay-constrained deployment.

Figure 8:
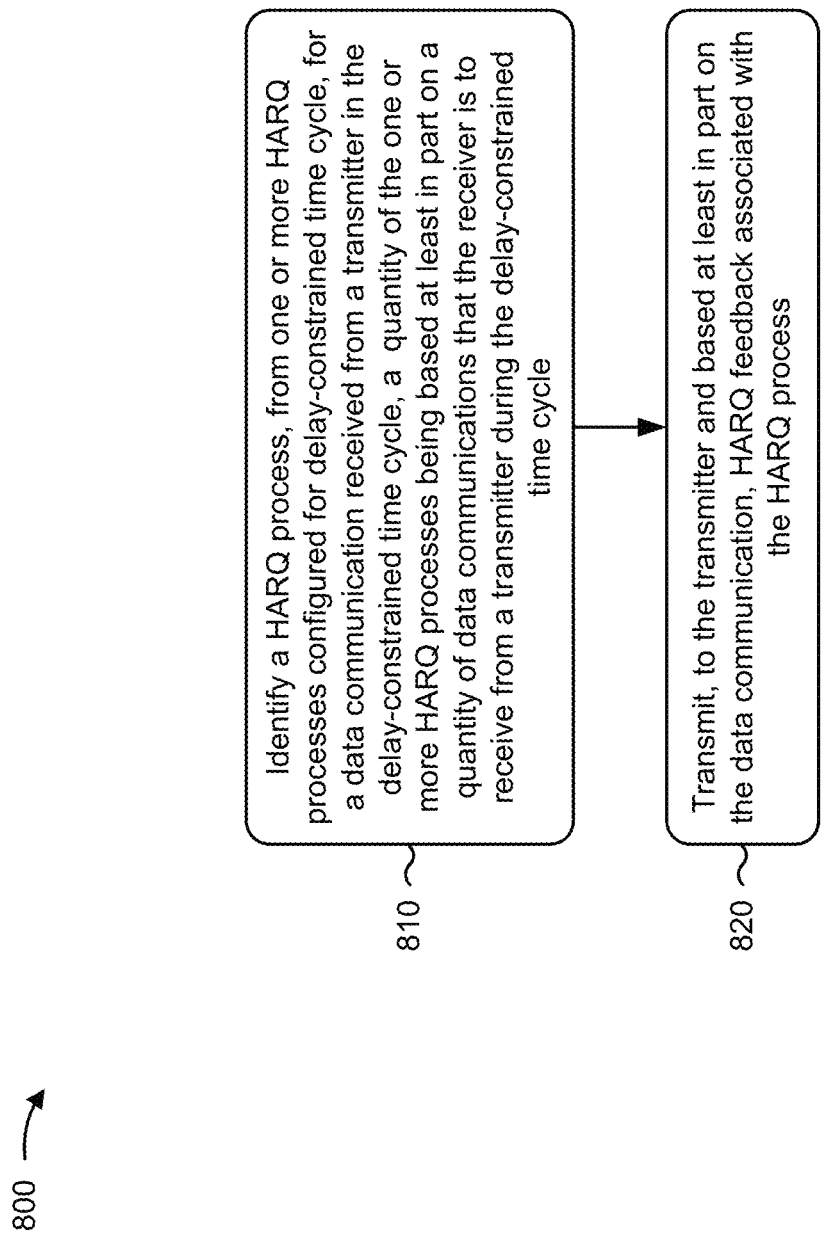
FIG. 8 is a diagram illustrating an example process performed by a receiver in accordance with various aspects of the present disclosure.

FIG. 8 is a diagram illustrating an example process 800 performed, for example, by a receiver, in accordance with various aspects of the present disclosure. Example process 800 is an example in which a receiver (such as UE 120 or BS 110) performs operations associated with HARQ process identification.

As shown in FIG. 8, in some aspects, process 800 may include identifying a HARQ process, from one or more HARQ processes configured for a delay-constrained time cycle, for a data communication received from a transmitter in the delay-constrained time cycle, a quantity of the one or more HARQ processes being based at least in part on a quantity of data communications that the receiver is to receive from a transmitter during the delay-constrained time cycle (block 810). For example, the receiver (for example, using transmit processor 220, receive processor 238, controller/processor 240, memory 242, receive processor 258, transmit processor 264, controller/processor 280, memory 282, among other possibilities/examples) may identify a HARQ process, from one or more HARQ processes configured for a delay-constrained time cycle, for a data communication received from a transmitter in the delay-constrained time cycle, as described above. In some aspects, a quantity of the one or more HARQ processes may be based at least in part on a quantity of data communications that the receiver is to receive from a transmitter during the delay-constrained time cycle.

As further shown in FIG. 8, in some aspects, process 800 may include transmitting, to the transmitter and based at least in part on the data communication, HARQ feedback associated with the HARQ process (block 820). For example, the receiver (for example, using transmit processor 220, receive processor 238, controller/processor 240, memory 242, receive processor 258, transmit processor 264, controller/processor 280, memory 282, among other possibilities/examples) may transmit, to the transmitter and based at least in part on the data communication, HARQ feedback associated with the HARQ process, as described above.

Process 800 may include additional aspects, such as any single aspect or any combination of aspects described below and/or in connection with one or more other processes described elsewhere herein.

In a first additional aspect, the quantity of data communications is one data communication, process 800 further includes determining that the quantity of the one or more HARQ processes is one HARQ process based at least in part on an indication that the quantity of the data communications is one data communication, and identifying the HARQ process includes identifying the HARQ process based at least in part on determining that the quantity of the one or more HARQ processes is one HARQ process. In a second additional aspect, alone or in combination with the first aspect, the receiver is a UE and process 800 further includes receiving an explicit indication of the quantity of the one or more HARQ processes. In a third additional aspect, alone or in combination with one or more of the first and second aspects, the receiver is a UE and process 800 further includes receiving an implicit indication of the quantity of the one or more HARQ processes. In a fourth additional aspect, alone or in combination with one or more of the first through third aspects, the implicit indication includes an indication for the transmitter to operate in an IIoT mode, the IIoT mode being associated with the quantity of the one or more HARQ processes.

In a fifth additional aspect, alone or in combination with one or more of the first through fourth aspects, the implicit indication includes an indication of the quantity of data communications, and process 800 further includes determining the quantity of the one or more HARQ processes based at least in part on the implicit indication. In a sixth additional aspect, alone or in combination with one or more of the first through fifth aspects, the one or more HARQ processes configured for the delay-constrained time cycle include a first subset of a plurality of HARQ processes configured for the transmitter and a second subset of the plurality of HARQ processes being configured for eMBB traffic or URLLC traffic. In a seventh additional aspect, alone or in combination with one or more of the first through sixth aspects, the HARQ feedback includes an ACK for the data communication or a NACK for the data communication.

In an eighth additional aspect, alone or in combination with one or more of the first through seventh aspects, the transmitter includes a UE or a BS. In a ninth additional aspect, alone or in combination with one or more of the first through eighth aspects, the quantity of the one or more HARQ processes is greater than one HARQ process and the HARQ feedback includes an explicit indication of a HARQ process identifier associated with the HARQ process. In a tenth additional aspect, alone or in combination with one or more of the first through ninth aspects, the HARQ process identifier is based at least in part on a transmission timing of the data communication in the delay-constrained time cycle. In an eleventh additional aspect, alone or in combination with one or more of the first through tenth aspects, the quantity of the one or more HARQ processes is one HARQ process and the HARQ feedback is an implicit indication of the HARQ process.

In a twelfth additional aspect, alone or in combination with one or more of the first through eleventh aspects, the receiver is a UE and process 800 further includes receiving an indication of the quantity of the one or more HARQ processes, the indication including an indication of a quantity of bits allocated for a HARQ process identifier associated with the HARQ process, and identifying the HARQ process includes identifying, based at least in part on the quantity of bits, the HARQ process identifier in a DCI communication associated with the data communication. In a thirteenth additional aspect, alone or in combination with one or more of the first through twelfth aspects, the DCI communication includes a downlink grant. In a fourteenth additional aspect, alone or in combination with one or more of the first through thirteenth aspects, the receiver is a BS and process 800 further includes transmitting an indication of the HARQ process to the transmitter in a DCI communication, the DCI communication including a uplink grant, and receiving the data communication from the transmitter, the data communication indicating the HARQ process.

Figure 9:
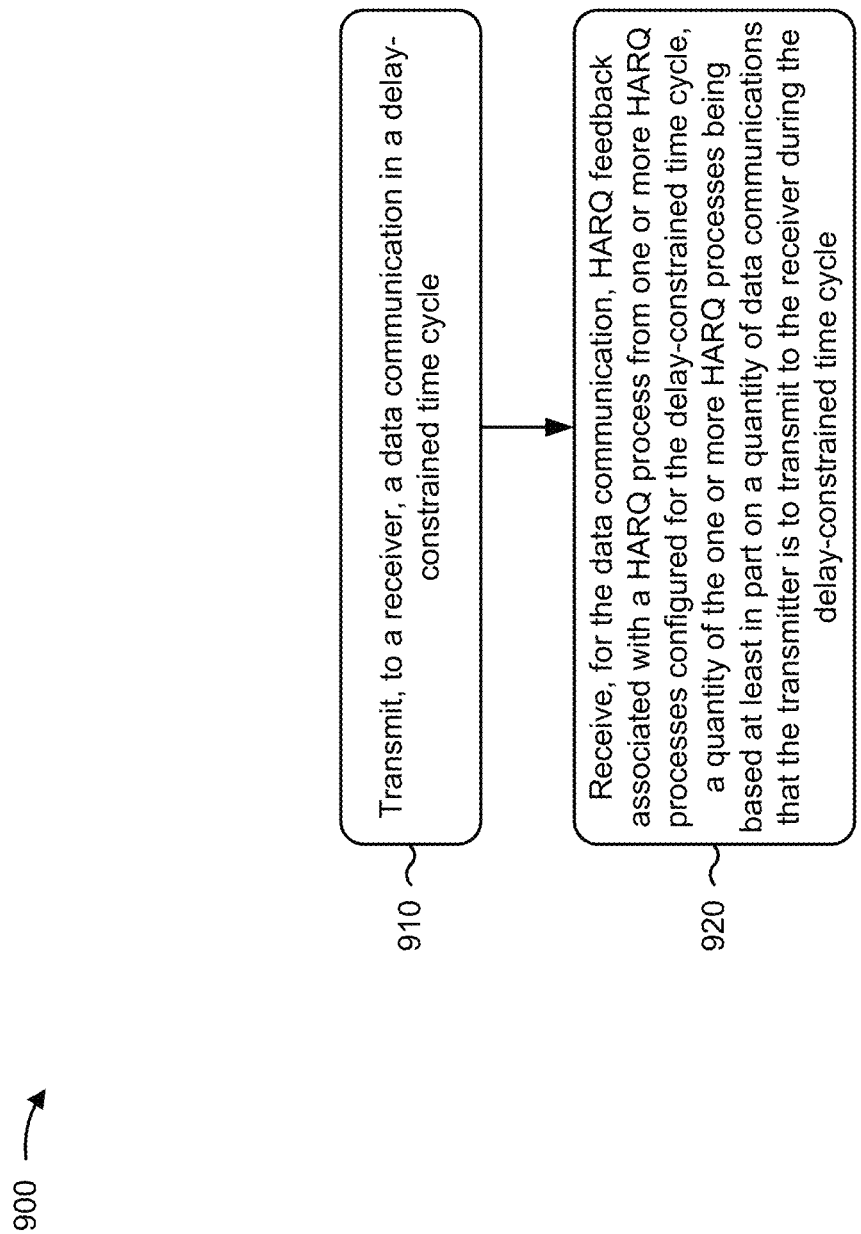
FIG. 9 is a diagram illustrating an example process performed by a transmitter in accordance with various aspects of the present disclosure.

FIG. 9 is a diagram illustrating an example process 900 performed, for example, by a transmitter, in accordance with various aspects of the present disclosure. Example process 900 is an example where a transmitter (such as a BS 110 or a UE 120) performs operations associated with HARQ process identification.

As shown in FIG. 9, in some aspects, process 900 may include transmitting, to a receiver, a data communication in a delay-constrained time cycle (block 910). For example, the transmitter (for example, using transmit processor 220, receive processor 238, controller/processor 240, memory 242, receive processor 258, transmit processor 264, controller/processor 280, memory 282, among other possibilities/ examples) may transmit, to a receiver, a data communication in an industrial delay-constrained time cycle, as described above.

As further shown in FIG. 9, in some aspects, process 900 may include receiving, for the data communication, HARQ feedback associated with a HARQ process from one or more HARQ processes configured for the delay-constrained time cycle, a quantity of the one or more HARQ processes being based at least in part on a quantity of data communications that the transmitter is to transmit to the receiver during the delay-constrained time cycle (block 920). For example, the transmitter (for example, using transmit processor 220, receive processor 238, controller/processor 240, memory 242, receive processor 258, transmit processor 264, controller/processor 280, memory 282, among other possibilities/ examples) may receive, for the data communication, HARQ feedback associated with a HARQ process from one or more HARQ processes configured for the delay-constrained time cycle, as described above. In some aspects, a quantity of the one or more HARQ processes is based at least in part on a quantity of data communications that the transmitter is to transmit to the receiver during the delay-constrained time cycle.

Process 900 may include additional aspects, such as any single aspect or any combination of aspects described below and/or in connection with one or more other processes described elsewhere herein.

In a first additional aspect, the transmitter is a BS and process 900 further includes transmitting an explicit indication of the quantity of the one or more HARQ processes in a downlink grant. In a second additional aspect, alone or in combination with the first aspect, the transmitter is a BS and process 900 further includes transmitting an implicit indication of the quantity of the one or more HARQ processes. In a third additional aspect, alone or in combination with one or more of the first and second aspects, the implicit indication includes an indication for the receiver to operate in an IIoT mode, the IIoT mode being associated with the quantity of the one or more HARQ processes. In a fourth additional aspect, alone or in combination with one or more of the first through third aspects, the implicit indication includes an indication of the quantity of data communications.

In a fifth additional aspect, alone or in combination with one or more of the first through fourth aspects, the one or more HARQ processes configured for the delay-constrained time cycle include a first subset of a plurality of HARQ processes configured for the transmitter and a second subset of the plurality of HARQ processes being configured for eMMB traffic or URLLC traffic. In a sixth additional aspect, alone or in combination with one or more of the first through fifth aspects, the HARQ feedback includes an acknowledgement for the data communication or a negative acknowledgement for the data communication. In a seventh additional aspect, alone or in combination with one or more of the first through sixth aspects, the quantity of the one or more HARQ processes is greater than one HARQ process and the HARQ feedback includes an explicit indication of a HARQ process identifier associated with the HARQ process. In an eighth additional aspect, alone or in combination with one or more of the first through seventh aspects, the HARQ process identifier is based at least in part on a transmission timing of the data communication in the delay-constrained time cycle. In a ninth additional aspect, alone or in combination with one or more of the first through eighth aspects, the quantity of the one or more HARQ processes is one HARQ process and the HARQ feedback is an implicit indication of the HARQ process.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
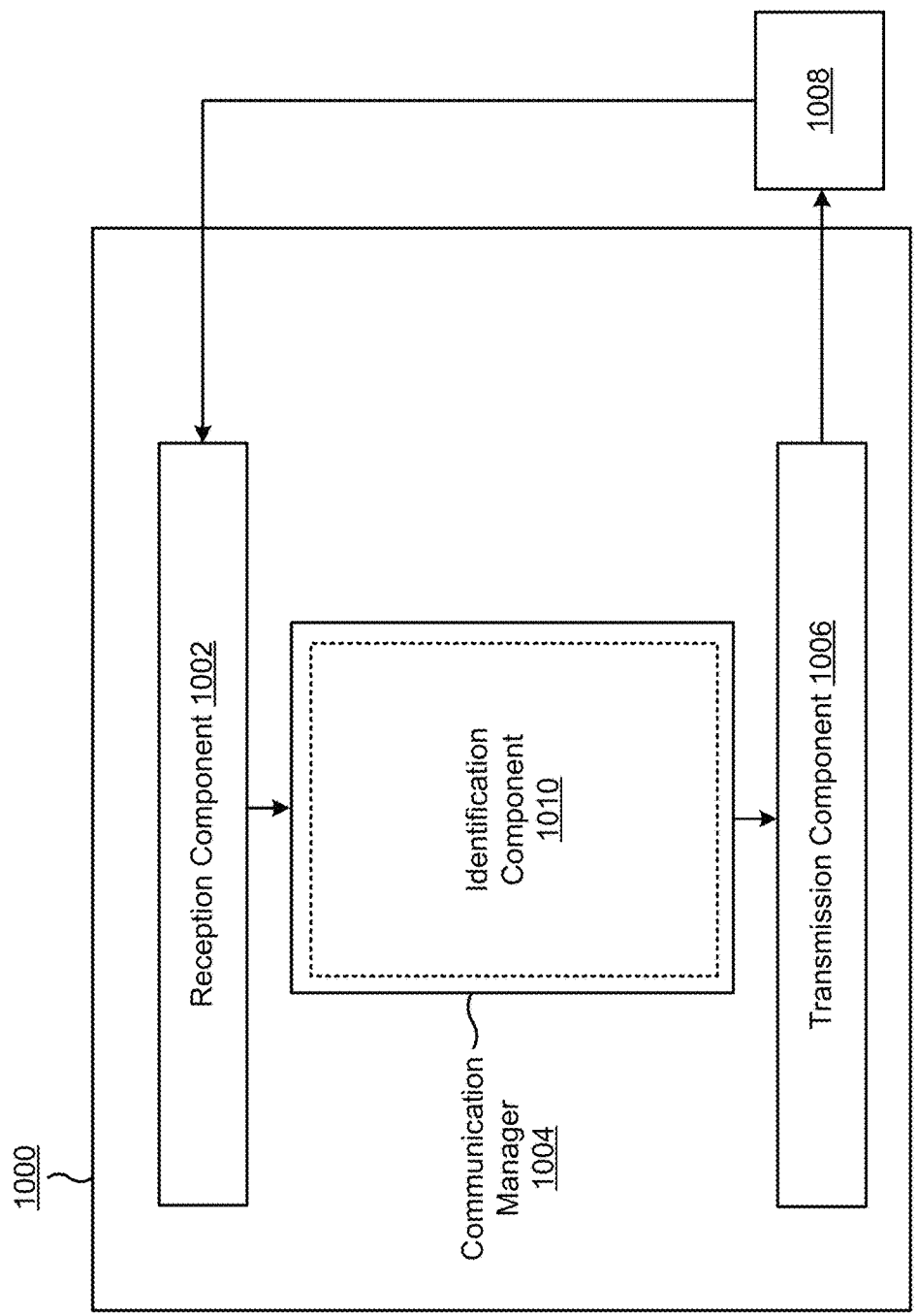
FIGS. 10 and 11 are block diagrams of example apparatuses for wireless communication in accordance with various aspects of the present disclosure.

FIG. 10 is a block diagram of an example apparatus 1000 for wireless communication in accordance with various aspects of the present disclosure. The apparatus 1000 may be a receiver (such as a UE 120 or a BS 110), or a receiver may include the apparatus 1000. In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as a UE 120, a BS 110, or another wireless communication device) using the reception component 1002 and the transmission component 1006.

In some aspects, the apparatus 1000 may be configured to perform one or more operations described herein in connection with FIGS. 5A-7B. Additionally or alternatively, the apparatus 1000 may be configured to perform one or more processes described herein, such as process 800 of FIG. 8 or a combination thereof. In some aspects, the apparatus 1000 may include one or more components of the receiver described above in connection with FIG. 2.

The reception component 1002 may receive communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the receiver described above in connection with FIG. 2.

The transmission component 1006 may transmit communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1006 may include one or more antennas, a modulator, a transmit MIMO processor, a transmit processor, a controller/processor, a memory, or a combination thereof, of the receiver described above in connection with FIG. 2. In some aspects, the transmission component 1006 may be collocated with the reception component 1002 in a transceiver.

The communication manager 1004 may identify a HARQ process for data communication received from a transmitter in a delay-constrained time cycle. The communication manager 1004 may identify the HARQ process from one or more HARQ processes configured for the delay-constrained time cycle. The quantity of the one or more HARQ processes may be based at least in part on a quantity of data communications that the apparatus 1000 is to receive from the apparatus 1008 during the delay-constrained time cycle. In some aspects, the communication manager 1004 may receive (or may cause reception component 1002 to receive) an explicit indication or an implicit indication of the quantity of the one or more HARQ processes.

The communication manager 1004 may transmit (or may cause transmission component 1006 to transmit) HARQ feedback associated with the HARQ process. The communication manager 1004 may transmit (or may cause transmission component 1006 to transmit) the HARQ feedback to the apparatus 1008 based at least in part on the data communication. In some aspects, the communication manager 1004 may transmit (or may cause transmission component 1006 to transmit) an indication of the HARQ process to the transmitter in a DCI communication, where the DCI communication includes an uplink grant. In some aspects, the communication manager 1004 may receive (or may cause reception component 1002 to receive) the data communication from the apparatus 1008, the data communication indicating the HARQ process. In some aspects, the communication manager 1004 may include a controller/processor, a memory, a scheduler, a communication unit, or a combination thereof, of the receiver described above in connection with FIG. 2.

In some aspects, the communication manager 1004 may include a set of components, such as an identification component 1010 or other components. Alternatively, the set of components may be separate and distinct from the communication manager 1004. In some aspects, one or more components of the set of components may include or may be implemented within a controller/processor, a memory, a scheduler, a communication unit, or a combination thereof, of the receiver described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The identification component 1010 may identify the HARQ process for the data communication from the one or more HARQ processes. In some aspects, the identification component 1010 may identify the HARQ process based at least in part on a determination that the quantity of the one or more HARQ processes is one HARQ process. In some aspects, the reception component 1002 may receive indication of the quantity of the one or more HARQ processes, the indication including an indication of a quantity of bits allocated for a HARQ process identifier associated with the HARQ process. In these examples, the identification component 1010 may identify, based at least in part on the quantity of bits, the HARQ process identifier in a DCI communication associated with the data communication.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

Figure 11:
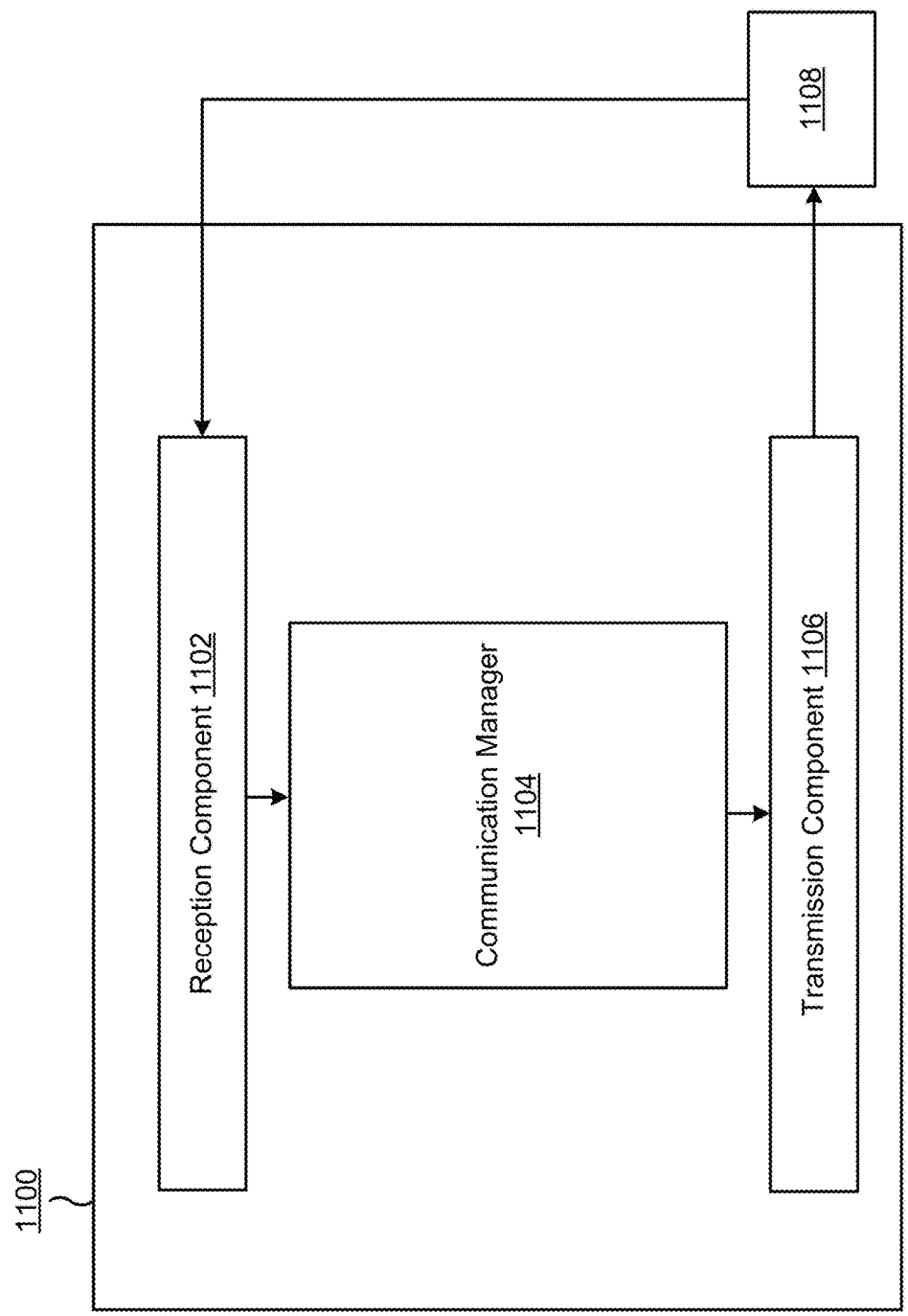

FIG. 11 is a block diagram of an example apparatus 1100 for wireless communication in accordance with various aspects of the present disclosure. The apparatus 1100 may be a transmitter such as a UE 120 or a BS 110), or a transmitter may include the apparatus 1100. In some aspects, the apparatus 1100 includes a reception component 1102, a communication manager 1104, and a transmission component 1106, which may be in communication with one another (for example, via one or more buses). As shown, the apparatus 1100 may communicate with another apparatus 1108 (such as a UE 120, a BS 110, or another wireless communication device) using the reception component 1102 and the transmission component 1106.

In some aspects, the apparatus 1100 may be configured to perform one or more operations described herein in connection with FIGS. 5A-7B. Additionally or alternatively, the apparatus 1100 may be configured to perform one or more processes described herein, such as process 900 of FIG. 9 or a combination thereof. In some aspects, the apparatus 1100 may include one or more components of the transmitter described above in connection with FIG. 2.

The reception component 1102 may receive communications, such as reference signals, control information, data communications, or a combination thereof, from the apparatus 1108. The reception component 1102 may provide received communications to one or more other components of the apparatus 1100, such as the communication manager 1104. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a demodulator, a MIMO detector, a receive processor, a controller/processor, a memory, or a combination thereof, of the transmitter described above in connection with FIG. 2.

The transmission component 1106 may transmit communications, such as reference signals, control information, data communications, or a combination thereof, to the apparatus 1108. In some aspects, the communication manager 1104 may generate communications and may transmit the generated communications to the transmission component 1106 for transmission to the apparatus 1108. In some aspects, the transmission component 1106 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1106 may include one or more antennas, a modulator, a transmit MIMO processor, a transmit processor, a controller/processor, a memory, or a combination thereof, of the transmitter described above in connection with FIG. 2. In some aspects, the transmission component 1106 may be collocated with the reception component 1102 in a transceiver.

The communication manager 1104 may transmit (or may cause transmission component 1106 to transmit), to the apparatus 1108, a data communication in a delay-constrained time cycle. The communication manager 1104 may receive (or may cause transmission component 1106 to receive), from apparatus 1108, HARQ feedback for the data communication. The HARQ feedback may be associated with a HARQ process from one or more HARQ processes configured for the delay-constrained time cycle. A quantity of the one or more HARQ processes being based at least in part on a quantity of data communications that the apparatus 1100 is to transmit to the apparatus 1108 during the delay-constrained time cycle. In some aspects, the communication manager 1104 may transmit (or may cause transmission component 1106 to transmit) an explicit indication or an implicit indication of the quantity of the one or more HARQ processes. In some aspects, the communication manager 1104 may transmit (or may cause transmission component 1106 to transmit) an explicit indication of the quantity of the one or more HARQ processes in a DCI communication that includes a downlink grant. In some aspects, the communication manager 1104 may include a controller/processor, a memory, a scheduler, a communication unit, or a combination thereof, of the transmitter described above in connection with FIG. 2.

In some aspects, the communication manager 1104 may include a set of components. Alternatively, the set of components may be separate and distinct from the communication manager 1104. In some aspects, one or more components of the set of components may include or may be implemented within a controller/processor, a memory, a scheduler, a communication unit, or a combination thereof, of the transmitter described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, or the like, or combinations thereof), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A method of wireless communication performed by a receiver, comprising:
    receiving an implicit indication of a quantity of one or more hybrid automatic repeat request (HARQ) processes configured for a delay-constrained time cycle, the implicit indication including an indication for a transmitter to operate in an industrial Internet of things (IIoT) mode;
    identifying a HARQ process, from the one or more HARQ processes, for a data communication received from the transmitter in the delay-constrained time cycle, the quantity of the one or more HARQ processes being determined based at least in part on the indication for the transmitter to operate in the IIoT mode and being the same as a quantity of data communications that the receiver is to receive from the transmitter during the delay-constrained time cycle; and
    transmitting, to the transmitter and based at least in part on the data communication, HARQ feedback associated with the HARQ process.

2. The method of claim 1, wherein the quantity of data communications is one data communication, wherein the method further comprises determining that the quantity of the one or more HARQ processes is one HARQ process based at least in part on the quantity of the data communications being one data communication, and wherein identifying the HARQ process comprises identifying the HARQ process based at least in part on determining that the quantity of the one or more HARQ processes is one HARQ process.

3. The method of claim 1, wherein the receiver is a user equipment (UE), and the method further comprises receiving an explicit indication of the quantity of the one or more HARQ processes.

4. The method of claim 1, wherein the implicit indication includes an indication of the quantity of data communications, and the method further comprises determining the quantity of the one or more HARQ processes based at least in part on the implicit indication.

5. The method of claim 1, wherein the one or more HARQ processes includes a first subset of a plurality of HARQ processes configured for the transmitter and a second subset of the plurality of HARQ processes being configured for enhanced mobile broadband traffic or ultra reliable low latency communication traffic.

6. The method of claim 1, wherein the HARQ feedback comprises an acknowledgement for the data communication or a negative acknowledgement for the data communication.

7. The method of claim 1, wherein the quantity of the one or more HARQ processes is greater than one HARQ process and the HARQ feedback includes an explicit indication of a HARQ process identifier associated with the HARQ process.

8. The method of claim 7, wherein the HARQ process identifier is based at least in part on a transmission timing of the data communication in the delay-constrained time cycle.

9. The method of claim 1, wherein the quantity of the one or more HARQ processes is one HARQ process and the HARQ feedback is an implicit indication of the HARQ process.

10. The method of claim 1, wherein the receiver is a user equipment (UE), wherein the implicit indication includes an indication of a quantity of bits allocated for a HARQ process identifier associated with the HARQ process, and wherein identifying the HARQ process comprises identifying, based at least in part on the quantity of bits, the HARQ process identifier in a downlink control information (DCI) communication associated with the data communication.

11. The method of claim 10, wherein the DCI communication comprises a downlink grant.

12. The method of claim 1, wherein the receiver is a network node, and the method further comprises:
    transmitting an indication of the HARQ process to the transmitter in a downlink control information (DCI) communication, the DCI communication comprising an uplink grant and
    receiving the data communication from the transmitter, the data communication indicating the HARQ process.

13. A method of wireless communication performed by a transmitter, comprising:
    transmitting, to a receiver, an implicit indication of a quantity of one or more hybrid automatic repeat request (HARQ) processes configured for a delay-constrained time cycle, the implicit indication including an indication for the receiver to operate in an industrial Internet of things (IIoT) mode;
    transmitting, to the receiver, a data communication in the delay-constrained time cycle; and
    receiving, for the data communication, hybrid automatic repeat request (HARQ) feedback associated with a HARQ process from the one or more HARQ processes, a quantity of the one or more HARQ processes being based at least in part on the indication for the receiver to operate in the IIOT mode and being the same as a quantity of data communications that the transmitter is to transmit to the receiver during the delay-constrained time cycle.

14. The method of claim 13, wherein the transmitter is a network node, and the method further comprises transmitting an explicit indication of the quantity of the one or more HARQ processes in a downlink control information (DCI) communication that includes a downlink grant.

15. The method of claim 13, wherein the implicit indication includes an indication of the quantity of data communications.

16. The method of claim 13, wherein the one or more HARQ processes includes a first subset of a plurality of HARQ processes configured for the transmitter and a second subset of the plurality of HARQ processes being configured for enhanced mobile broadband traffic or ultra reliable low latency communication traffic.

17. The method of claim 13, wherein the quantity of the one or more HARQ processes is greater than one HARQ process and the HARQ feedback includes an explicit indication of a HARQ process identifier associated with the HARQ process.

18. The method of claim 17, wherein the HARQ process identifier is based at least in part on a transmission timing of the data communication in the delay-constrained time cycle.

19. The method of claim 13, wherein the quantity of the one or more HARQ processes is one HARQ process and the HARQ feedback is an implicit indication of the HARQ process.

20. A receiver for wireless communication, comprising:
a memory; and
one or more processors coupled to the memory, the one or more processors configured to:
receive an implicit indication of a quantity of one or more hybrid automatic repeat request (HARQ) processes configured for a delay-constrained time cycle, the implicit indication including an indication for a transmitter to operate in an industrial Internet of things (IIoT) mode;
identify a HARQ process, from the one or more HARQ processes, for a data communication received from the transmitter in the delay-constrained time cycle, the quantity of the one or more HARQ processes being determined based at least in part on the indication for the transmitter to operate in the IIOT mode and being the same as a quantity of data communications that the receiver is to receive from the transmitter during the delay-constrained time cycle; and
transmit, to the transmitter and based at least in part on the data communication, HARQ feedback associated with the HARQ process.

21. The receiver of claim 20, wherein the quantity of data communications is one data communication, wherein the one or more processors are further configured to determine that the quantity of the one or more HARQ processes is one HARQ process based at least in part on the quantity of the data communications being one data communication, and wherein the one or more processors, when identifying the HARQ process, are configured to identify the HARQ process based at least in part on determining that the quantity of the one or more HARQ processes is one HARQ process.

22. The receiver of claim 20, wherein the receiver is a user equipment (UE), wherein the implicit indication includes an indication of a quantity of bits allocated for a HARQ process identifier associated with the HARQ process, and wherein the one or more processors, when identifying the HARQ process, are configured to identify, based at least in part on the quantity of bits, the HARQ process identifier in a downlink control information (DCI) communication associated with the data communication.

23. The receiver of claim 20, wherein the one or more processors are further configured to:
transmit an indication of the HARQ process to the transmitter in a downlink control information (DCI) communication, the DCI communication comprising an uplink grant and
receive the data communication from the transmitter, the data communication indicating the HARQ process.

24. A transmitter for wireless communication, comprising:
a memory; and
one or more processors coupled to the memory, the one or more processors configured to:
transmit, to a receiver, an implicit indication of a quantity of one or more hybrid automatic repeat request (HARQ) processes configured for a delay-constrained time cycle, the implicit indication including an indication for the receiver to operate in an industrial Internet of things (IIoT) mode;
transmit, to the receiver, a data communication in the delay-constrained time cycle; and
receive, for the data communication, hybrid automatic repeat request (HARQ) feedback associated with a HARQ process from the one or more HARQ processes, a quantity of the one or more HARQ processes being based at least in part on the indication for the receiver to operate in the IIOT mode and being the same as a quantity of data communications that the transmitter is to transmit to the receiver during the delay-constrained time cycle.

25. The transmitter of claim 24, wherein the transmitter is a network node, and the one or more processors are further configured to transmit an explicit indication of the quantity of the one or more HARQ processes in a downlink control information (DCI) communication that includes a downlink grant.

26. The receiver of claim 20, wherein the receiver is a user equipment (UE), and the one or more processors are further configured to receive an explicit indication of the quantity of the one or more HARQ processes.

27. The receiver of claim 20, wherein the implicit indication includes an indication of the quantity of data communications, and the one or more processors are further configured to determine the quantity of the one or more HARQ processes based at least in part on the implicit indication.

28. The receiver of claim 22, wherein the DCI communication comprises a downlink grant.

29. The transmitter of claim 24, wherein the implicit indication includes an indication of the quantity of data communications.

30. The transmitter of claim 24, wherein the one or more HARQ processes includes a first subset of a plurality of HARQ processes configured for the transmitter and a second subset of the plurality of HARQ processes being configured for enhanced mobile broadband traffic or ultra reliable low latency communication traffic.

\* \* \* \* \*